United States Patent [19]

Misaizu et al.

[11] Patent Number: 5,896,351
[45] Date of Patent: *Apr. 20, 1999

[54] RECORDING METHOD FOR OPTICAL DISK DRIVE

[75] Inventors: Tadayuki Misaizu; Shigeki Tsukatani; Tatsuya Inokuchi, all of Kanagawa, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/713,680

[22] Filed: Sep. 17, 1996

[30] Foreign Application Priority Data

Sep. 18, 1995 [JP] Japan .................................... 7-238758

[51] Int. Cl.$^6$ ........................................................ G11B 7/00
[52] U.S. Cl. .............................. 369/32; 369/54; 369/58; 369/59
[58] Field of Search ............................. 369/54, 58, 32, 369/47, 49, 48, 59, 275.3

[56] References Cited

U.S. PATENT DOCUMENTS

| | | | |
|---|---|---|---|
| 5,559,778 | 9/1996 | Inokuchi et al. | 369/58 |
| 5,666,338 | 9/1997 | Ishizawa et al. | 369/48 |

FOREIGN PATENT DOCUMENTS

| | | | |
|---|---|---|---|
| 0519670 A2 | 12/1992 | European Pat. Off. | G11B 20/18 |
| 0569045 A1 | 11/1993 | European Pat. Off. | G11B 20/18 |
| 0673029 A1 | 9/1995 | European Pat. Off. | G11B 20/18 |

Primary Examiner—David C. Nelms
Assistant Examiner—Kim-Kwok Chu
Attorney, Agent, or Firm—Limbach & Limbach L.L.P.

[57] ABSTRACT

An information recording method based on a recording format in which when information is recorded on an information recording medium by a recording means, accompanying information concerning at least the information recording medium or recording information is repeatedly recorded a plurality of times together with the recording information comprises the steps of searching a recording failure position in an area in which the accompanying information is to be recorded when a recording of the accompanying information is failed, moving the recording means from a recording start position to the recording failure position, and recording the accompanying information from the recording failure position by the recording means based on the recording format. A write once optical disk recording method based on a recording format in which when information is recorded on a write once optical disk by a recording means, accompanying information concerning at least the write once optical disk or the recording information is repeatedly recorded a plurality of times together with the recording information comprises the steps of searching a recording failure position in an area in which the accompanying information is to be recorded when a recording of the accompanying information is failed, moving the recording means from a recording start position to the recording failure position and recording the accompanying information from the recording failure position by the recording means based on the recording format.

13 Claims, 15 Drawing Sheets

FIG. 14

| Frame Number | CONTROL & ADR | TNO | POINT | WIN | SEC | FRM | ZERO | PMIN | PSEC | PFRM |
|---|---|---|---|---|---|---|---|---|---|---|
| 1 | 02 | 00 | 00 | 20 | 15 | 14 | 00 | 00 | 00 | 00 |
| ⋮ | ⋮ | ⋮ | ⋮ | ⋮ | ⋮ | ⋮ | ⋮ | ⋮ | ⋮ | ⋮ |
| 10 | 02 | 00 | 00 | 20 | 15 | 14 | 09 | 00 | 00 | 00 |
| 11 | 01 | 00 | 01 | 05 | 45 | 67 | 00 | 00 | 02 | 01 |
| 12 | 01 | 00 | 01 | 05 | 45 | 67 | 01 | 00 | 02 | 01 |
| 13 | 01 | 00 | 01 | 05 | 45 | 67 | 02 | 00 | 02 | 01 |
| 14 | 01 | 00 | 01 | 05 | 45 | 67 | 03 | 00 | 02 | 01 |
| 15 | 01 | 00 | 01 | 05 | 45 | 67 | 04 | 00 | 02 | 01 |
| 16 | 01 | 00 | 02 | 12 | 01 | 09 | 05 | 05 | 45 | 67 |
| 17 | 01 | 00 | 02 | 12 | 01 | 09 | 06 | 05 | 45 | 67 |
| 18 | 01 | 00 | 02 | 12 | 01 | 09 | 07 | 05 | 45 | 67 |
| 19 | 01 | 00 | 02 | 12 | 01 | 09 | 08 | 05 | 45 | 67 |
| 20 | 01 | 00 | 02 | 12 | 01 | 09 | 09 | 05 | 45 | 67 |
| 21 | 01 | 00 | 03 | 30 | 17 | 42 | 00 | 12 | 01 | 09 |
| 22 | 01 | 00 | 03 | 30 | 17 | 42 | 01 | 12 | 01 | 09 |
| 23 | 01 | 00 | 03 | 30 | 17 | 42 | 02 | 12 | 01 | 09 |
| 24 | 01 | 00 | 03 | 30 | 17 | 42 | 03 | 12 | 01 | 09 |
| 25 | 01 | 00 | 03 | 30 | 17 | 42 | 04 | 12 | 01 | 09 |
| 26 | 01 | 00 | 04 | 37 | 50 | 18 | 05 | 30 | 17 | 42 |
| 27 | 01 | 00 | 04 | 37 | 50 | 18 | 06 | 30 | 17 | 42 |
| 28 | 01 | 00 | 04 | 37 | 50 | 18 | 07 | 30 | 17 | 42 |
| 29 | 01 | 00 | 04 | 37 | 50 | 18 | 08 | 30 | 17 | 42 |
| 30 | 01 | 00 | 04 | 37 | 50 | 18 | 09 | 30 | 17 | 42 |
| 31 | 03 | 00 | 01 | 02 | 03 | 04 | 00 | 00 | 00 | 00 |
| 32 | 03 | 00 | 01 | 02 | 03 | 04 | 01 | 00 | 00 | 00 |
| 33 | 03 | 00 | 01 | 02 | 03 | 04 | 02 | 00 | 00 | 00 |
| 34 | 03 | 00 | 01 | 02 | 03 | 04 | 03 | 00 | 00 | 00 |
| 35 | 03 | 00 | 01 | 02 | 03 | 04 | 04 | 00 | 00 | 00 |
| 36 | 05 | 00 | 01 | 05 | 45 | 67 | 05 | 05 | 42 | 67 |
| 37 | 05 | 00 | 01 | 05 | 45 | 67 | 06 | 05 | 42 | 67 |
| 38 | 05 | 00 | 01 | 05 | 45 | 67 | 07 | 05 | 42 | 67 |
| 39 | 05 | 00 | 01 | 05 | 45 | 67 | 08 | 05 | 42 | 67 |
| 40 | 05 | 00 | 01 | 05 | 45 | 67 | 09 | 05 | 42 | 67 |
| 41 | 01 | 00 | 05 | 42 | 16 | 32 | 00 | 37 | 50 | 18 |
| 42 | 01 | 00 | 05 | 42 | 16 | 32 | 01 | 37 | 50 | 18 |
| 43 | 01 | 00 | 05 | 42 | 16 | 32 | 02 | 37 | 50 | 18 |
| 44 | 01 | 00 | 05 | 42 | 16 | 32 | 03 | 37 | 50 | 18 |
| 45 | 01 | 00 | 05 | 42 | 16 | 32 | 04 | 37 | 50 | 18 |
| 46 | 04 | 00 | 01 | 03 | 04 | 00 | 05 | 00 | 00 | 00 |
| 47 | 04 | 00 | 01 | 03 | 04 | 00 | 06 | 00 | 00 | 00 |
| 48 | 04 | 00 | 01 | 03 | 04 | 00 | 07 | 00 | 00 | 00 |
| 49 | 04 | 00 | 01 | 03 | 04 | 00 | 08 | 00 | 00 | 00 |
| 50 | 04 | 00 | 01 | 03 | 04 | 00 | 09 | 00 | 00 | 00 |
| 51 | etc ; unrecorded | | | | | | | | | |

FIG. 15

| Frame Number | CONTROL & ADR | TNO | POINT | WIN | SEC | FRM | ZERO | PMIN | PSCE | PFRM |
|---|---|---|---|---|---|---|---|---|---|---|
| n | 01 | 00 | A0 | absolute | time | | 00 | 01 | 00 | 00 |
| n+1 | 01 | 00 | A0 | absolute | time | | 00 | 01 | 00 | 00 |
| n+2 | 01 | 00 | A0 | absolute | time | | 00 | 01 | 00 | 00 |
| n+3 | 05 | 00 | B1 | 00 | 00 | 00 | 00 | 03 | 01 | 00 |
| n+4 | 05 | 00 | B1 | 00 | 00 | 00 | 00 | 03 | 01 | 00 |
| n+5 | 05 | 00 | B1 | 00 | 00 | 00 | 00 | 03 | 01 | 00 |
| n+6 | 01 | 00 | A1 | absolute | time | | 00 | 05 | 00 | 00 |
| n+9 | 05 | 00 | B2 | 03 | 00 | 00 | 00 | 00 | 00 | 00 |
| n+12 | 01 | 00 | A2 | absolute | time | | 00 | 42 | 16 | 32 |
| n+15 | 05 | 00 | 01 | 05 | 45 | 67 | 00 | 05 | 42 | 67 |
| n+18 | 01 | 00 | 01 | absolute | time | | 00 | 00 | 02 | 01 |
| n+21 | 05 | 00 | 02 | 37 | 53 | 00 | 00 | 37 | 50 | 18 |
| n+24 | 01 | 00 | 02 | absolute | time | | 00 | 05 | 45 | 67 |
| n+27 | 05 | 00 | 03 | 42 | 16 | 32 | 00 | 43 | 14 | 00 |
| n+30 | 01 | 00 | 03 | absolute | time | | 00 | 12 | 01 | 09 |
| n+33 | 05 | 00 | B1 | 00 | 00 | 00 | 00 | 03 | 01 | 00 |
| n+36 | 01 | 00 | 04 | absolute | time | | 00 | 30 | 17 | 42 |
| n+39 | 05 | 00 | B2 | 03 | 00 | 00 | 00 | 00 | 00 | 00 |
| n+42 | 01 | 00 | 05 | absolute | time | | 00 | 37 | 50 | 18 |
| n+45 | 05 | 00 | 01 | 05 | 45 | 67 | 00 | 05 | 42 | 67 |
| n+48 | 01 | 00 | A0 | absolute | time | | 00 | 01 | 00 | 00 |
| n+51 | 05 | 00 | 02 | 37 | 53 | 00 | 00 | 37 | 50 | 18 |
| n+54 | 01 | 00 | A1 | absolute | time | | 00 | 05 | 00 | 00 |
| n+57 | etc | | | | | | | | | |

70 { (rows n through n+5)

RECORDING METHOD FOR OPTICAL DISK DRIVE

BACKGROUND OF THE INVENTION

The present invention relates to an information recording method of repairing repeat data recorded on a write once optical disk (CD-R) and a recording method for a write once optical disk.

Heretofore, there is an optical disk device capable of recording information by sequentially forming pits with irradiation of light beams on a disk-like recording medium. One of such optical disk devices is known as a CD-R (CD-Recordable) conforming to the standards of so-called compact disc (CD).

An optical disk used in such CD-R drive device is a so-called write once optical disk (hereinafter referred to as "CD-R") in which information can be written once by changing optical property of a recording layer within a pregroove which is a previously-formed guide groove with irradiation of light beam of high intensity.

A data structure of CD-R will be described. A PCA (Power Calibration Area) for indicating a light amount adjustment area is formed in the innermost peripheral portion near the center of the optical disk. The PCA area includes a test area for adjusting a light amount of light beam used upon recording and a count area for recording the available state of the test area.

A PMA (Program Memory Area) indicating a program area is formed adjacent to the PCA area in the outer peripheral direction from the center of the optical disk. In the PMA area, there are repeatedly recorded the available state of the optical disk, to be concrete, start address information and end address information of data recorded at the track unit.

There are formed a plurality of sessions adjacent to the PMA area in the outer peripheral direction from the center of the optical disk. Each session includes a lead-in area, a program area and a lead-out area in the outer peripheral direction from the center of the optical disk. In the lead-in area, there are repeatedly recorded data of table of contents information of a signal recorded on the program area as TOC (Table of Contents).

Audio data or the like is recorded on the program area. The program area is shown by a track number corresponding to the number of data to be recorded. The track includes a TD (Track Descriptor) indicative of data structure within the track and a packet which is a unit of data smaller than the track. The same information is repeatedly recorded on the TD.

As one of methods for recording data in the program area of the CD-R once, there is known a track recording method for recording data at the track unit. The track means a collection of data indicative of one music or one file of more than one music or file.

When the track is recorded, an area in which data is not recorded in the program area on the optical disk, i.e., a non-recording area is detected by reading data from the PMA area and data is recorded on the non-recording area at the track unit.

Further, data is recorded at the unit of packet which is the data unit smaller than the track unit. A data recording operation at the packet unit is called "intra-track recording". At that time, information indicative of start address and end address of track are initially recorded in the PMA area such that the track is previously formed of packets of arbitrary number. In the intra-track recording operation, data is sequentially and continuously recorded from the first packet within the track. After this data recording operation is interrupted, data is again recorded from the next address of the address of the final recorded data.

As described above, in the CD-R information recording format, PMA, TOC and TD data of the same information should be recorded continuously a plurality of times at predetermined recording units. Further, in the next recording operation, data should be continuously recorded on the ending portion of the recorded recording unit located on the outermost periphery of the CD-R.

However, in the conventional information recording method of the CD-R, when recording operation of data such as PMA, TOC or TD data is failed and the recording operation is ended in the middle of recording operation, the information recording method does not take a countermeasure for repairing data at all. As a consequence, since the recording in the recording unit area is not completed in accordance with the format, there is then the disadvantage that data cannot be recorded on the area following the recording failure area.

SUMMARY OF THE INVENTION

In view of the aforesaid aspect, it is an object of the present invention to provide an information recording method and a write once optical disk recording method in which recording failure information that should be recorded repeatedly can be repaired.

According to an aspect of the present invention, there is provided an information recording method based on a recording format in which when information is recorded on an information recording medium by a recording means, accompanying information concerning at least the information recording medium or recording information is repeatedly recorded a plurality of times together with the recording information. This information recording method comprises the steps of searching a recording failure position in an area in which the accompanying information is to be recorded when a recording of the accompanying information is failed, moving the recording means from a recording start position to the recording failure position, and recording the accompanying information from the recording failure position by the recording means based on the recording format.

According to another aspect of the present invention, there is provided a write once optical disk recording method based on a recording format in which when information is recorded on a write once optical disk by a recording means, accompanying information concerning at least the write once optical disk or the recording information is repeatedly recorded a plurality of times together with the recording information. This write once optical disk recording method comprises the steps of searching a recording failure position in an area in which the accompanying information is to be recorded when a recording of the accompanying information is failed, moving the recording means from a recording start position to the recording failure position and recording the accompanying information from the recording failure position by the recording means based on the recording format.

According to the information recording method of the present invention, there can be achieved the following actions.

By monitoring a tracking error signal and a focus error signal supplied from a servo circuit while information is being recorded, it is determined whether or not the data recording unit of accompanying information that should be written a plurality of times is finished correctly. For example, when the tracking error signal and the focus error signal are displaced from predetermined error ranges and disturbed, it is determined that the data recording unit is not finished correctly.

If it is determined that the previous recording is finished correctly, then recording of this time is continuously made on the following area. If on the other hand the previous recording is not ended correctly, then a signal is repaired such that a recorded signal may be ended correctly.

If the data recording unit of accompanying information that should be written a plurality of times is not ended correctly, a recording failure position is detected based on the tracking error signal and the focus error signal. Then, an optical block is moved and data of accompanying information which is recording failure data stored in a memory is read out from the memory at different timing. At that time, timing and drive power level for driving a laser driver are switched through a signal modulator in such a manner that a laser power level supplied to a laser light-emitting diode of the optical block is set to relatively low power level from the recording start position to the recording failure position and that the laser power level supplied to the laser light-emitting diode of the optical block is set to relatively high write power level from the recording failure position to the recording end position.

Thus, while information is being recorded, a write once recording area on the CD-R is searched and the laser power level is switched, thereby moving the optical block to the starting portion of the recording failure track which is the starting portion of the write one recording area, resulting in write once recording being carried out.

The write once optical disk recording method according to the present invention can achieve the following actions.

When writing of accompanying information is started, the position of the optical block is set to the light-emitting position (write start position) of write power. Then, write data of accompanying information is generated. A control signal is supplied to the servo circuit in such a manner that the position of the optical block is moved to the write preparing position, in this case, the write power light-emitting position (write start position), whereby the optical block releases the initial position and is moved in the radius direction of the CD-R.

Then, it is determined whether or not the position of the optical block is moved from the write preparing position to the write power emitting position, in this case, the write start position. This judgement is repeated until the position of the optical block has finished being moved to the write power emitting position. If the position of the optical block has finished being moved to the write power emitting position, then the laser light-emitting diode of the optical block is energized to emit write laser power.

Then, it is determined whether or not the accompanying information is successfully written at the predetermined recording unit. It is determined based on the status of the tracking error signal and the focus error signal supplied from the servo circuit whether or not the writing is successful. Accordingly, this recording unit of amount corresponding to information tracks to be recorded on the CD-R is written and operation is ended.

If the writing is not successful, then the write failure position is searched by moving the position of the optical block to the write failure position. At that time, write data becomes write successful data from the write start position to the write failure position and becomes write failure data from the write failure position to the write end position. Then, the above processing and the above judgement are repeated. If the writing is successful, then operation is ended.

Specifically, the position of the optical block is moved from the write preparing position, in this case, the write power emitting position (write start position) to the searched write failure position, whereby the optical block releases the initial position and is moved in the radius position of the CD-R. At that time, the laser power of the laser light-emitting diode of the optical block is set to read laser power although the timing is the write timing. Accordingly, the optical block only traces the CD-R from the write start position to the write failure position and write once data provided at that time becomes data that is to be traced with read power.

It is determined whether or not the position of the optical block is moved from the write preparing position to the write power emitting position, in this case, the write failure position. This judgement is repeated until the position of the optical block has finished being moved to the write power emitting position. If the position of the optical block has finished being moved to the write power emitting position, then the laser light-emitting diode of the optical block is energized to emit write laser power.

It is determined one more time whether or not accompanying information is successfully written at the predetermined recording unit. Specifically, it is determined based on the status of the tracking error signal and the focus error signal supplied from the servo circuit whether or not the writing of accompanying data is successful. If the accompanying information is successfully written at the predetermined recording unit, then operation is ended. At that time, write once data becomes write once data of write power from the write failure position to the write end position.

BRIEF DESCRIPTION OF THE DRAWINGS

FIG. 14 is a diagram showing PMA recording format of the write once optical disk recording apparatus according to the present invention; and FIG. 15 is a diagram showing a TOC recording format of the write once optical disk recording apparatus according to the present invention.

DETAILED DESCRIPTION OF THE PREFERRED EMBODIMENT

The present invention will now be described with reference to the drawings.

Initially, a recording format of CD-R will be described. The recording format is standardized by the same assignee of the present application and Phillips in joint-development. This standard is written in the so-called ORANGE BOOK ISO/IEC.

A data structure of CD-R which assumes the present invention will be described. FIGS. 1A through 1D are diagrams showing a data structure on the CD-R.

Figure 1A:
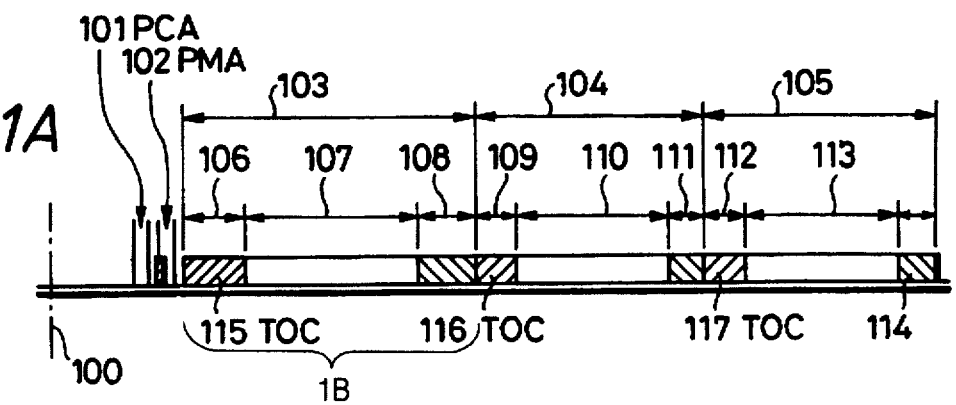
FIGS. 1A through 1D are schematic diagrams showing a structure of data on the optical disk.

As shown in FIG. 1A, a PCA (Power Calibration Area) 101 showing a light amount adjustment area is provided in the innermost peripheral portion near a disk center 100. The PCA 101 includes a test area for adjusting an amount of light beam used to record information and a count area for recording the available state of the test area.

A PMA (Program Memory Area) 102 indicating a program area is provided adjacent to the PCA 101 in the outer peripheral direction of the disk center 100. In this PMA 102, there are repeatedly recorded the available states of the program area of the CD-R, i.e., start address information and end address information of data recorded at the track unit.

Concrete contents of the PMA 102 are as follows.

The PMA 102 includes three kinds of information. The first contents are track numbers of start time and end time of recorded information. In this data, contents concerning partial recordings are recorded in the form of a table. The track numbers of all tracks provided within the PMA 102 can be incremented continuously and step-by-step. All tracks include ancillary tracks. The second contents are identification information for CD-R. In order to identify each disk, there can be recorded a number of six digits. The third contents are skip information and unskip information. The skip information indicates that all of one track or a part of recorded track is skipped during playback. The unskip information means that a skip command is canceled.

A PMA recording sequence will be de scribed. Data has to be written in the PMA 102 at the unit of 10 frames. In other words, the writing of data in the PMA 102 is constantly executed at a multiple of 10 subcode frames. Within the unit of 10 frames, the same information is assigned to "0" (first frame) to "9" (last frame) at "ZERO" byte in which the continuous frame is subcode Q channel . In the p ortion in which the P1 is recorded, cyclic counts from "0" to "9" are continuously repeated at the "ZERO" byte.

Information called item is provided within the subcode frame. One item is repeated five times within the continuous 5 subcode frames. Inasmuch as one item comprises 10 subcode frames, the continuous five items of one item are labeled by "0" to "4" or "5" to "9". When the item which is not even-numbered within a plurality of items should be recorded, the latest item within these items are repeated not five times but 10 times because a recording is executed at a multiple of 10 subcodes. In this case, when the item is repeated 10 times, the same information is assigned to "0" to "9" of "ZERO" byte of the subcode. The first item is recorded when the PMA is started. Specifically, in the PMA, the same information is repeatedly recorded 10 times or two information are repeatedly recorded five times during the 10 frames.

There are provided a plurality of sessions 103, 104, 105 adjacent to the PMA area in the outer peripheral direction from the disk center 100. The sessions 103, 104, 105 include lead-in areas 106, 109, 112, program areas 107, 110, 113 and lead-out area 108, 111, 114 are provided in the outer peripheral direction from the disk center 100. In the lead-in areas 106, 109, 112, there are repeatedly recorded a plurality of times data of table of contents of signals recorded in the program area 107, 110, 113 as TOC (Table Of Contents).

Specific contents of the TOCs 115, 116, 117 are as follows. When the optical disk is completed, the TOCs 115, 116, 117 are written in the lead-in areas 106, 109, 112. After the optical disk was completed, information cannot be recorded on the optical disk. The TOCs are started at starting points of the lead-in areas 106, 109, 112. Within the TOCs 115, 116, 117, each item is repeated three times. The completed TOCs 115, 116, 117 are continuously repeated in the lead-in areas 106, 109, 112.

Figure 1B:
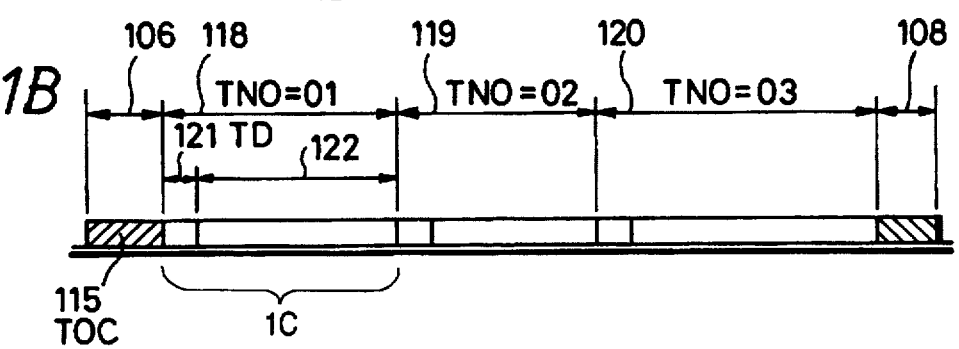
Figure 1C:
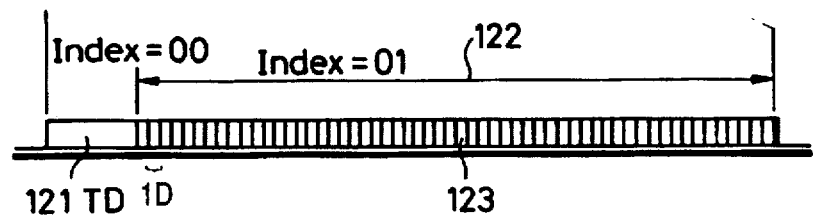

Audio data etc., are recorded in the program areas 107, 110, 113. FIG. 1B shows a data structure of the session 103. As shown in FIG. 1B, there are provided track numbers TNOs in response to the number of data to be recorded. In this embodiment, three data tracks 118, 119, 120 are provided in one session. Each of the tracks 118, 119, 120 comprises two areas which can be discriminated by indexes. FIG. 1C shows a data structure of the track 118. As shown in FIG. 1C, the track 118 includes a TD (Track Descriptor) 121 indicative of track structure information and a packet 123 which is a unit of data smaller than the track 118. Similarly to the TOCs 115, 116, 117, in the TD 121, the same information is repeatedly recorded a plurality of times.

Specific contents of the TD are as follows. The TD includes information concerning attribute of track of user data 122. This information contains information concerning attribute of preceding track. The TD comprises two portions. The first content is a TD table. The TD table is located at the start position of each user data 122 and is 8 bytes in length. The second contents are a plurality of TD units. One unit is composed of 16 bytes. The TD unit describes data attributes of each track. The data attributes are track number, three track recording systems of track-at-once system, fixed length packet system and variable-length packet system and packet size, etc. The first TD unit is directly located behind the TD table. When information is recorded in the TD, the same information is repeated within this area for 2 or longer seconds.

Figure 1D:
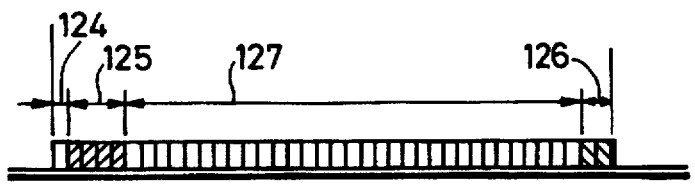

FIG. 1D shows a data structure of the packet 123. A link block area 124 is located at the starting portion of the packet 123. The link block area 124 constructs a link portion to the preceding packet together with a run-in area 125. This embodiment shows the fixed-length packet system in which the packet length is fixed. A user data area 127 is located between the run-in area 125 and a run-out area 126. Data cannot be recorded in the run-in area 125 and the run-out area 126 but the run-in area 125 and the run-out area 126 are guard areas.

Figure 2:
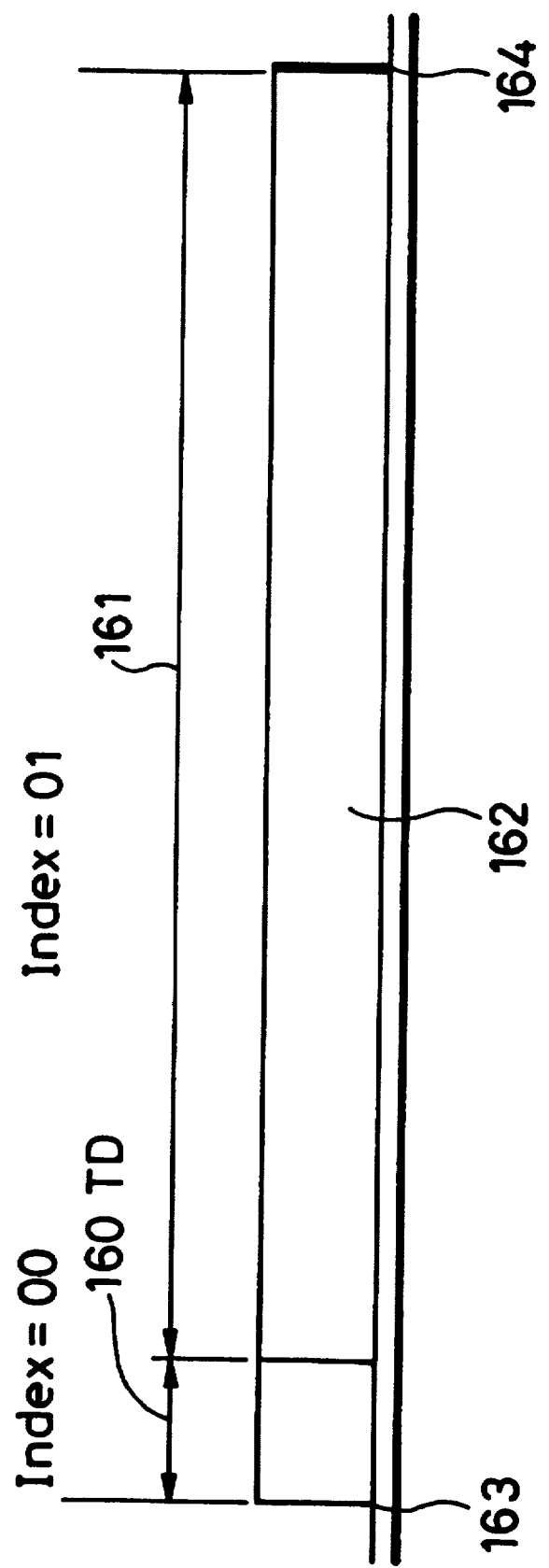
FIG. 2 is a schematic diagram showing a data structure of a track at once system packet.

A recording system will be described. FIG. 2 shows a data structure of packet based on the track-at-once system. An area in which the table of contents is "00" is TD 160. In the TD 160, there is recorded information indicative of the fact that a packet 162 is recorded according to the track-at-once system. An area in which table of contents is "01" is a recording area of user data 161. In accordance with the track-at-once system, a quasi-signal (e.g., data of all "0s") is recorded up to the run-out area. Link blocks 163, 164 are buffer zones.

Figure 3:
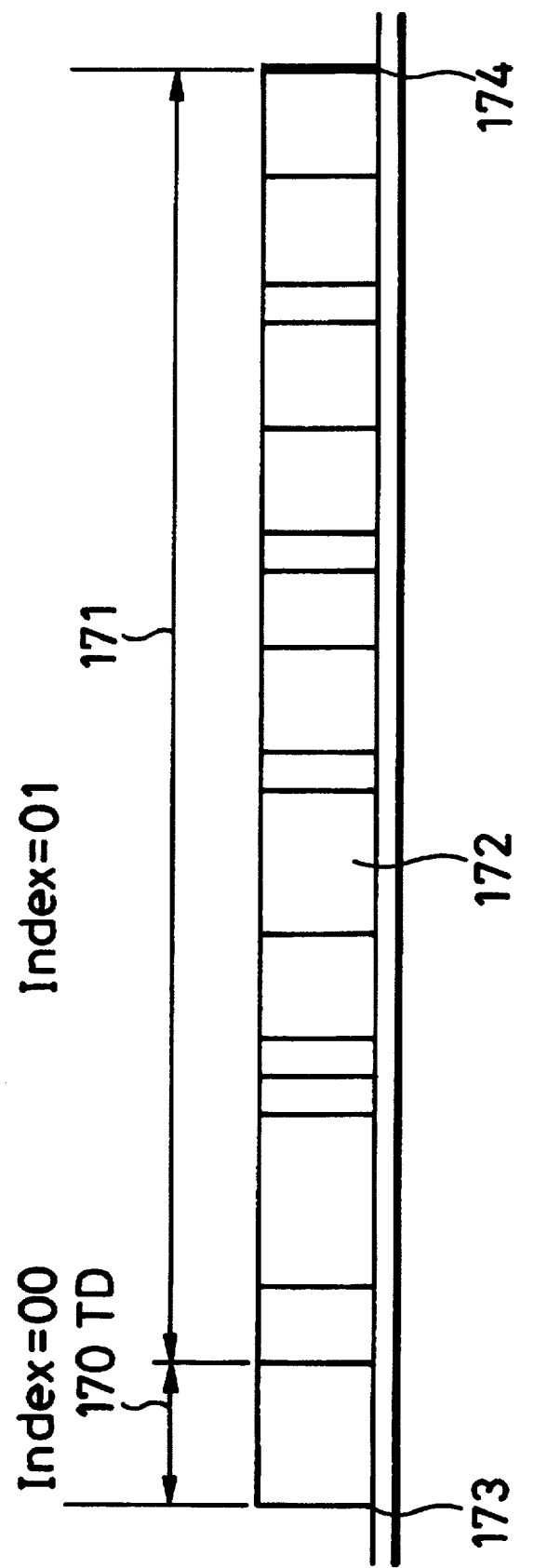
FIG. 3 is a schematic diagram showing a data structure of a variable length packet system.

FIG. 3 shows a data structure of a packet of variable-length system. As shown in FIG. 3, an area in which table of contents is "00" is TD 170. In the TD 170, there is recorded information indicative of the fact that a packet 172 is recorded according to the variable-length recording system. An area in which table of contents is "01" is a recording area of user data 171. Each packet 172 is composed of blocks of an arbitrary number larger than 8 blocks (user data is one block). Link-blocks 173, 174 are buffer zones.

Figure 4:
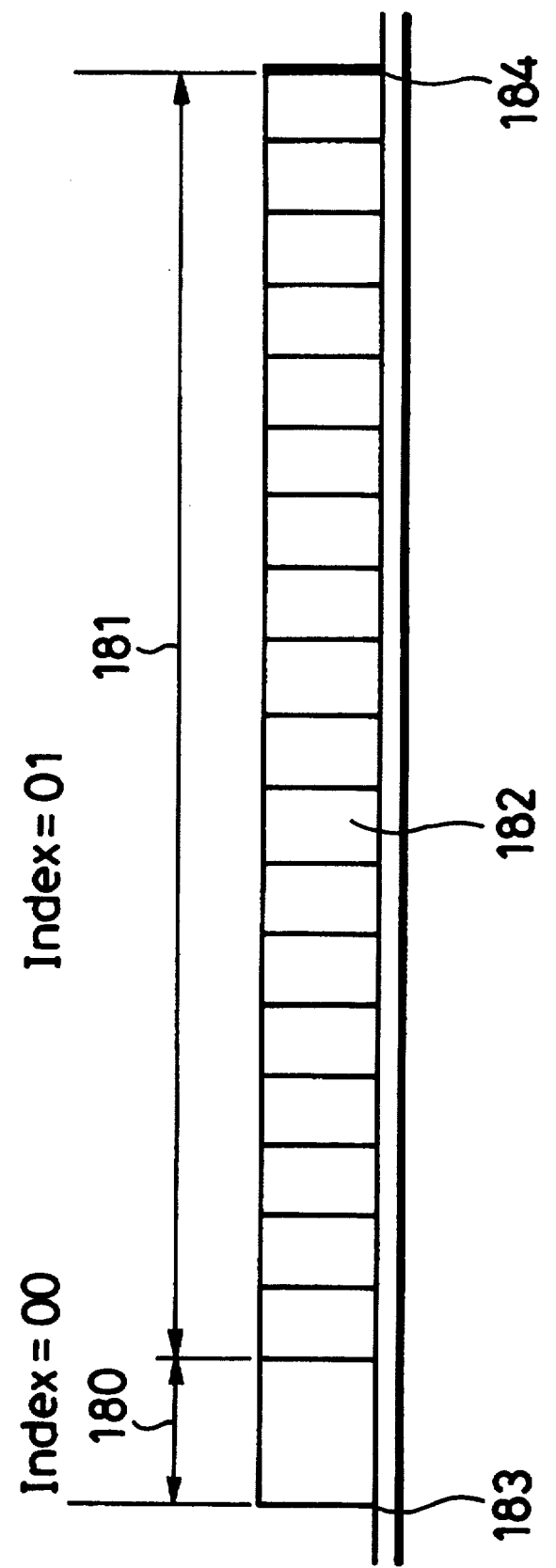
FIG. 4 is a schematic diagram showing a data structure of a fixed length packet system.

FIG. 4 shows a data structure of a packet of fixed-length system. As shown in FIG. 4, an area in which table of contents is "00" is TD 180. In the TD 180, there are recorded information indicative of the fact that a packet 182 is recorded according to the variable-length system and a block number of packet length. In this embodiment, there is recorded the packet length whose block number is equal. An area in which table of contents is "01" is a recording area of user data 181. The user data 181 is composed of blocks of packet length recorded on the TD 180. Link-blocks 183, 184 are buffer zones.

Figure 5:
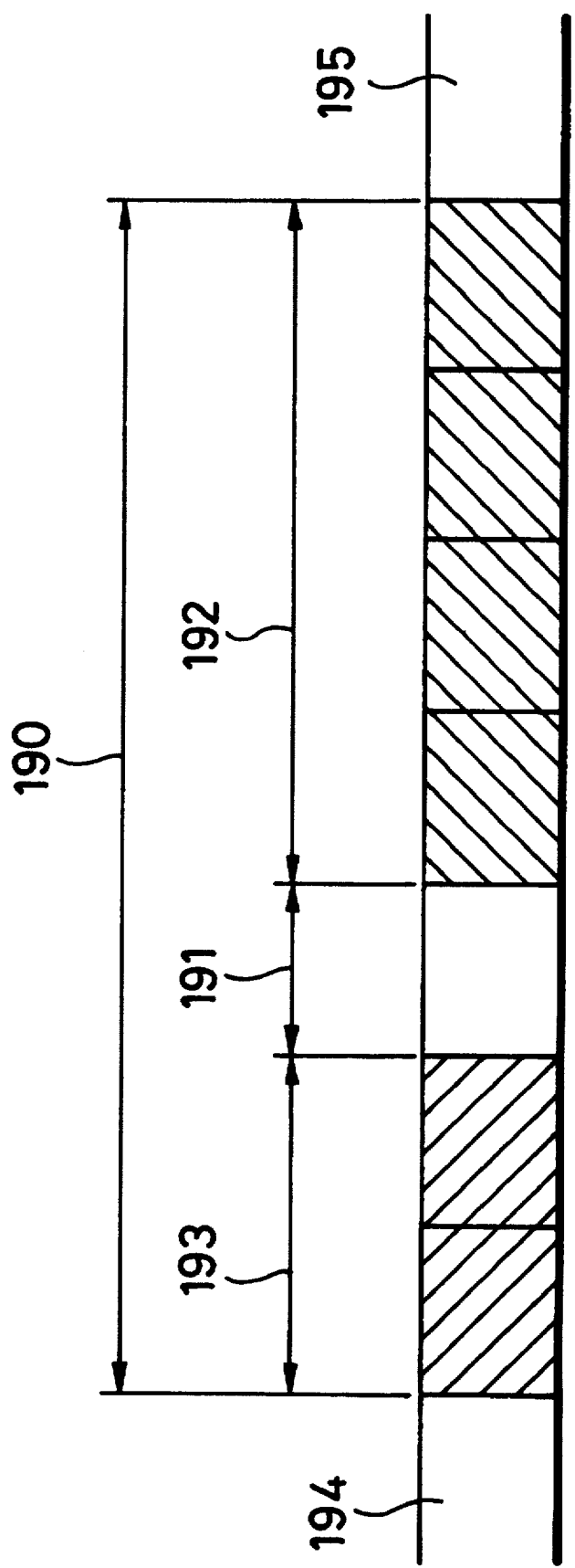
FIG. 5 is a schematic diagram showing a data structure of link blocks.

FIG. 5 shows a data structure of link-blocks. As shown in FIG. 5, the link-block comprises totally 7 blocks of one block of link block area 191, 4 blocks of run-in area 192 and 2 blocks of run-out area 193. In the data structure of link-blocks, the link-blocks of present packet are the link-block area 191 and the run-in area 192 and the link-block of the packet preceding the present packet is the run-out area 193.

As the track recording system, there can be selected at every track any one of the track-at-once system shown in FIG. 2, the variable-length packet system shown in FIG. 3 and the fixed-length packet system shown in FIG. 4. A selected system is described in the TD. The lead-in area and the lead-out area are treated as one track. The recording system of these areas is limited to only the track-at-once system.

The minimum recording unit within the track, i.e., the minimum packet is determined by the recording system described in the TD. In this embodiment, the minimum packet becomes track, i.e., one packet in the case of the track-at-once system shown in FIG. 2. The minimum packet becomes one packet in which user data is formed of one block in the case of the variable-length packet shown in FIG. 3. The minimum packet becomes a packet of a predetermined length described in the TD in the case of the fixed-length packet shown in FIG. 4.

Since data of a signal to be recorded in the CD-R is dispersed before and after, such signal recorded in the CD-R uses a CIRC (cross-interleave Reed Solomon coding) for correcting errors, if recording is interrupted at the position other than the predetermined position, then a part of data is dropped and it becomes impossible to reproduce data. Therefore, a signal has to be recorded without interruption within the packet.

If the writing of TOC used to recognize PMA, TD and CD-R used when data is written is not carried out at the predetermined recording unit and failed, then the recording of the recording unit area is not completed in accordance with a format. Therefore, it becomes impossible to record data in the succeeding area and the recording has to be carried out in such a fashion that the writing of PMA, TD and TOC may be completed at the predetermined recording unit.

As one of methods for recording data in the program area of the CD-R, i.e., recording data once, there is a data recording operation in which data is recorded at the track unit. The track is a collection of data of one music or file or more.

When the track recording operation is carried out, the area in which data is not recorded on the program area on the optical disk, i.e., a non-recording area is detected by reading data of the PMA area, and data is recorded once on the non-recording area at the track unit.

It is frequently observed that a data recording operation is carried out at the packet unit which is the data unit smaller than the track unit. This data recording operation carried out at the packet unit is called the intra-track recording operation. At that time, in order that a track is formed of packets of an arbitrary number, information of start address and end address of track is previously recorded on the PMA area. In the intra-track recording operation, data is sequentially and continuously recorded from the first packet within the track. Then, after this data recording operation was interrupted, data is again recorded from the next address of the address of the last recorded data.

Figure 6:
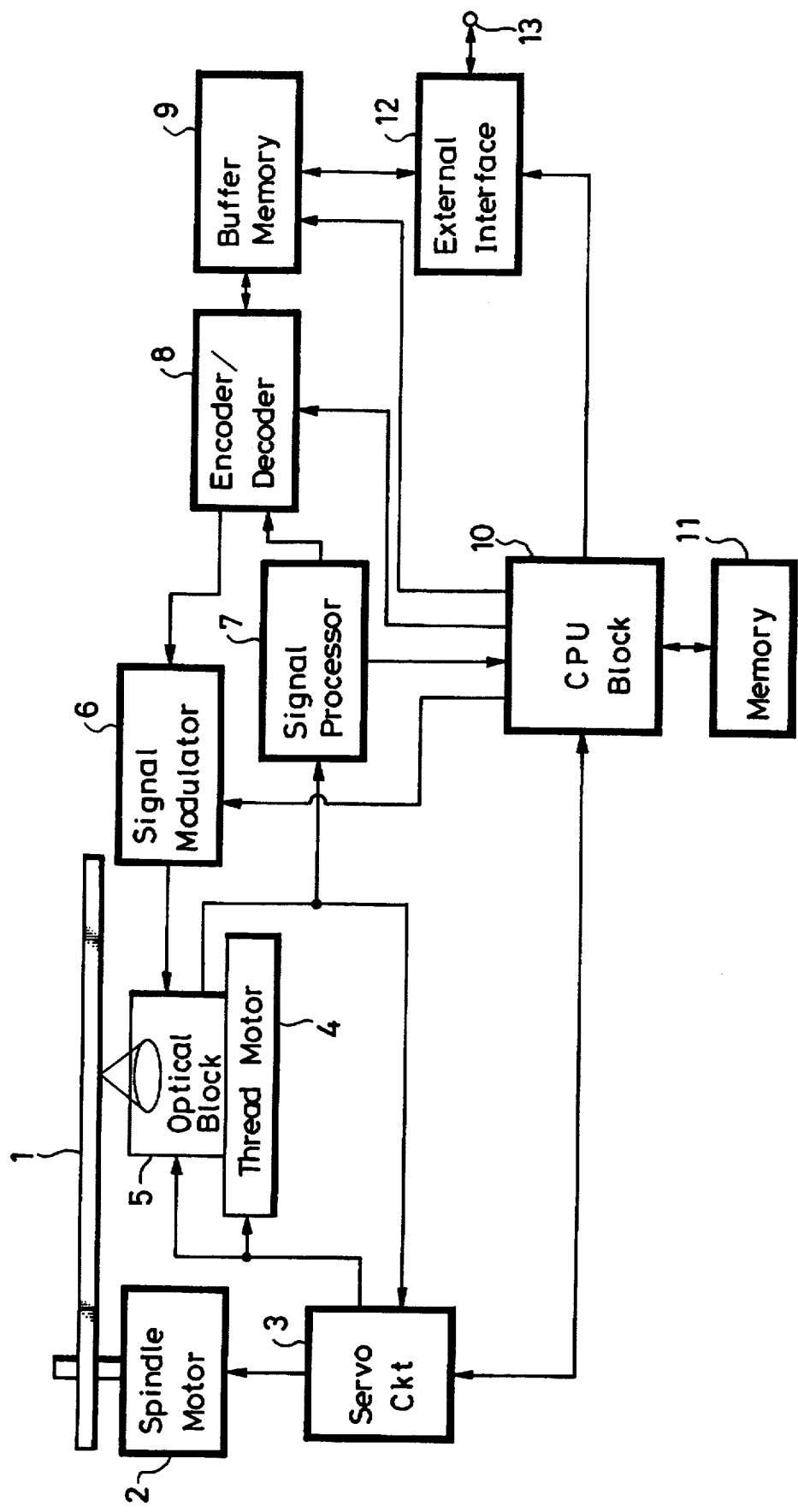
FIG. 6 is a block diagram showing a write once optical disk recording apparatus according to the present invention.

An arrangement of the present invention will be described below. FIG. 6 is a block diagram showing a write once optical disk recording apparatus. An arrangement of the write once optical disk recording apparatus will be described. As shown in FIG. 6, the write once optical disk recording apparatus comprises a CD-R whose information recording surface is formed by organic pigment, a spindle motor 2 for rotating the CD-R 1 at a predetermined constant linear velocity (CLV), a servo circuit 3 for effecting tracking servo, focusing servo and thread servo, an optical block 5 having an optical system, a laser light-emitting diode, a photodiode, a tracking actuator and a focusing actuator and a sled motor 4 for translating the optical block 5 in the radius direction of the CD-R 1.

Further, this write once optical disk recording apparatus includes a signal modulator 6 for generating a laser drive signal supplied to a laser driver (not shown), a signal processor 7 for generating various signals from a signal detected by a photodiode of the optical block 5, an encoder/decoder 8 for modulating a recording signal in an EFM (eight-to-fourteen modulation) fashion and error-correcting the recording signal or decoding a reproduced signal in an EFM fashion and error-correcting the reproduced signal, a CPU (central processing unit) block 10 for controlling respective circuits and portions of the write one optical disk recording apparatus, a memory 11 in which data of PMA, TOC, TD that should be written a plurality of times are stored, a buffer memory 9 for temporarily storing a recording signal or reproduced signal, an external interface circuit 12 for interfacing this write once optical disk recording apparatus to the outside, e.g., a host computer and a terminal 13 connected to the outside, e.g., the host computer.

A connection relationship of respective circuits and portions will be described below. The CD-R 1 is connected to the spindle motor 2 through a rotation mechanism. The servo circuit 3 is connected to the spindle motor 2. The servo circuit 3 is further connected to a tracking actuator and a focus actuator located within the optical block 5 and the sled motor 4. Further, the servo circuit 3 is connected to the CPU block 10.

The photodiode of the optical block 5 is connected to the servo circuit 3 and the signal processor 7. The signal processor 7 is connected to the encoder/decoder 8 and the CPU block 10. The encoder/decoder 8 is connected to the buffer memory 9 and the signal modulator 6. The signal modulator 6 is connected to the laser light-emitting diode of the optical block 5. The buffer memory 9 is connected to the external interface circuit 12. The external interface circuit 12 is connected to the terminal 13. The CPU block 10 is connected to the signal modulator 6, the encoder/decoder 8, the buffer memory 9, the external interface circuit 12 and the memory 9.

Operation of the write once optical disk recording apparatus will be described below. Initially, under servo-control of the servo circuit 3, the spindle motor 2 is driven to rotate the CD-R 1 at a predetermined constant linear velocity (CLV). The sled motor 4 translates the optical block 5 to the predetermined position in the radius direction.

Reflected light which results from irradiating laser beam on the CD-R 1 is received by the photodiode (e.g., quadrant photodetector). The optical block 5 supplies an output signal of the photodiode to the signal processor 7 and the servo circuit 3. The servo circuit 3 generates a tracking error signal and a focus error signal by adding and subtracting the signals supplied from the photodiode. The servo circuit 3 generates a thread control signal, a tracking control signal and a focus control signal by use of the thus generated tracking error signal and focus error signal, and supplies the tracking control signal and the focus control signal to the sled motor 4 and the tracking actuator and the focusing actuator disposed within the optical block 5. The servo circuit 3 further supplies the tracking error signal, the focus error signal or error signals corresponding to the tracking error signal and the focus error signal to the CPU block 10.

Thus, tracking control and focus control are carried out, whereby pits can be reliably formed on predetermined track positions on the CD-R 1 by the laser light-emitting diode of the optical block 5. Upon reproduction, it is possible to reproduce data highly reliably. Further, in the CD-R 1, grooves corresponding to the positions at which pits are formed are formed on the recording surface of the CD-R 1 by wobbling, and the tracking error signal can be generated based on the grooves. The wobbling is carried out by frequency modulation (FM). The signal processor 7 detects position information (absolute time information) by demodulating the frequency-modulated wobbling.

The position information is supplied to the CPU block 10 and the CPU block 10 controls access of the optical block based on this position information, whereby the write once optical disk recording apparatus can record data in predetermined areas of the CD-R 1 sequentially.

While recording data on the predetermined areas of the CD-R 1, it is determined by the CPU block 10 based on the tracking error signal and the focus error signal supplied thereto from the servo circuit 3 whether or not the data recording units of PMA, TOC and TD that should be written a plurality of times are finished correctly. When the tracking error signal and the focus error signal are out of a predetermined error range and disturbed, the CPU block 10 determines that the recording units are not ended correctly. At that time, the CPU block 10 monitors the reproduced RF signal, which is a recorded signal from the signal processor 7, and the data decoded by the encoder/decoder 8 and stops the recording operation immediately in response to the detection of the above error signal. Alternatively, the CPU block 10 may determined based on the tracking error signal and the focus error signal together with the reproduced RF signal and the decoded data whether the above recording units are completed correctly.

If it is determined by the CPU block 10 that the previous recording is ended correctly, then recording for repair is carried out continuously. If it is determined by the CPU block 10 that the previous recording is not ended correctly, then a signal is repaired in such a manner that the recorded signal is ended correctly. The repair of signal is carried out by the write once optical disk recording apparatus or via a command supplied from the external host computer through the terminal 13.

If it is determined by the CPU block 10 that the data recording units of PMA, TOC, TD data that should be written a plurality of times are not correctly ended, then the CPU block 10 detects a recording failure position based on the position information, the tracking error signal and the focus error signal. Then, the CPU block 10 controls the sled motor 4 so as to translate the optical block 5 and also reads out data of PMA, TOC, TD which are recording failure data stored in the memory 11 at different timings. At that time, the CPU block 10 switches a timing at which a laser driver (not shown) is driven and the level of drive power for driving the laser driver through the signal modulator 6 such that the level of laser power supplied to the laser light-emitting diode of the optical block 5 is set to relatively low read power level from the recording start position to the recording failure position and that the level of laser power supplied to the laser light-emitting diode of the optical block 5 is set to relatively high write power level from the recording failure position to a recording end position.

Accordingly, the CPU block 10 searches an area in which data is written once on the CD-R 1 while recording data. Also, the CPU block 10 translates the optical block 5 to the starting portion of the recording failure track, which is the starting portion of the area in which data is written once by switching the level of laser power.

Upon reproducing, the optical block 5 and the signal processor 7 generate reproduced RF signals to thereby detect the signal levels of the reproduced RF signals as will be described later on. The signal level detected result is supplied to the CPU block 10 as a digital signal. The reproduced RF signal is supplied to the encoder/decoder 8, in which it is decoded in an EFM fashion and error-corrected. The data thus decoded in an EFM fashion and error-corrected is supplied to and temporarily stored in the buffer memory 9. The data thus temporarily stored in the buffer memory 9 is transferred to the external host computer through the external interface circuit 12 and the terminal 13 at a predetermined timing.

Data generated from the external host computer is supplied through the terminal 13 and the external interface circuit 12 to the buffer memory 9 and thereby temporarily stored. The data temporarily stored in the buffer memory 9 is supplied to the encoder/decoder 8 at a predetermined timing. The data thus supplied to the encoder/decoder 8 is signal-processed in a predetermined manner such as EFM and error-correction. The signal thus EFM-modulated and error-corrected is supplied to the signal modulator 6. The signal modulator 6 generates a laser drive signal based on a laser beam on/off control signal supplied from the CPU block 10 in synchronism with the EFM-modulated and error-corrected signal. The laser drive signal is supplied to the laser driver (not shown). The laser driver irradiates laser beams on the CD-R 1 so as to form predetermined pits, whereby data is recorded on the CD-R 1 once. The buffer memory 9 acts to absorb a difference between a data rate in the apparatus and a data rate of data transferred between the apparatus and the host computer.

The signal reproduced from the CD-R 1 by the optical block 5 is stored in the buffer memory 9 through the signal processor 76 and the encoder/decoder 8. The data stored in the buffer memory 9 is transferred at a predetermined timing through the external interface 12 and the terminal 13 to the host computer. Incidentally, before the recording is started, under control of the servo circuit 3, an amount of light is adjusted by use of predetermined test data with respect to each light amount of laser beam of the laser light-emitting diode of the optical block 5.

A method of searching a boundary between a recording area and a non-recording area when data is recorded on the write once optical disk according to the present invention will be described below with reference to FIGS. 7 to 9.

Figure 7:
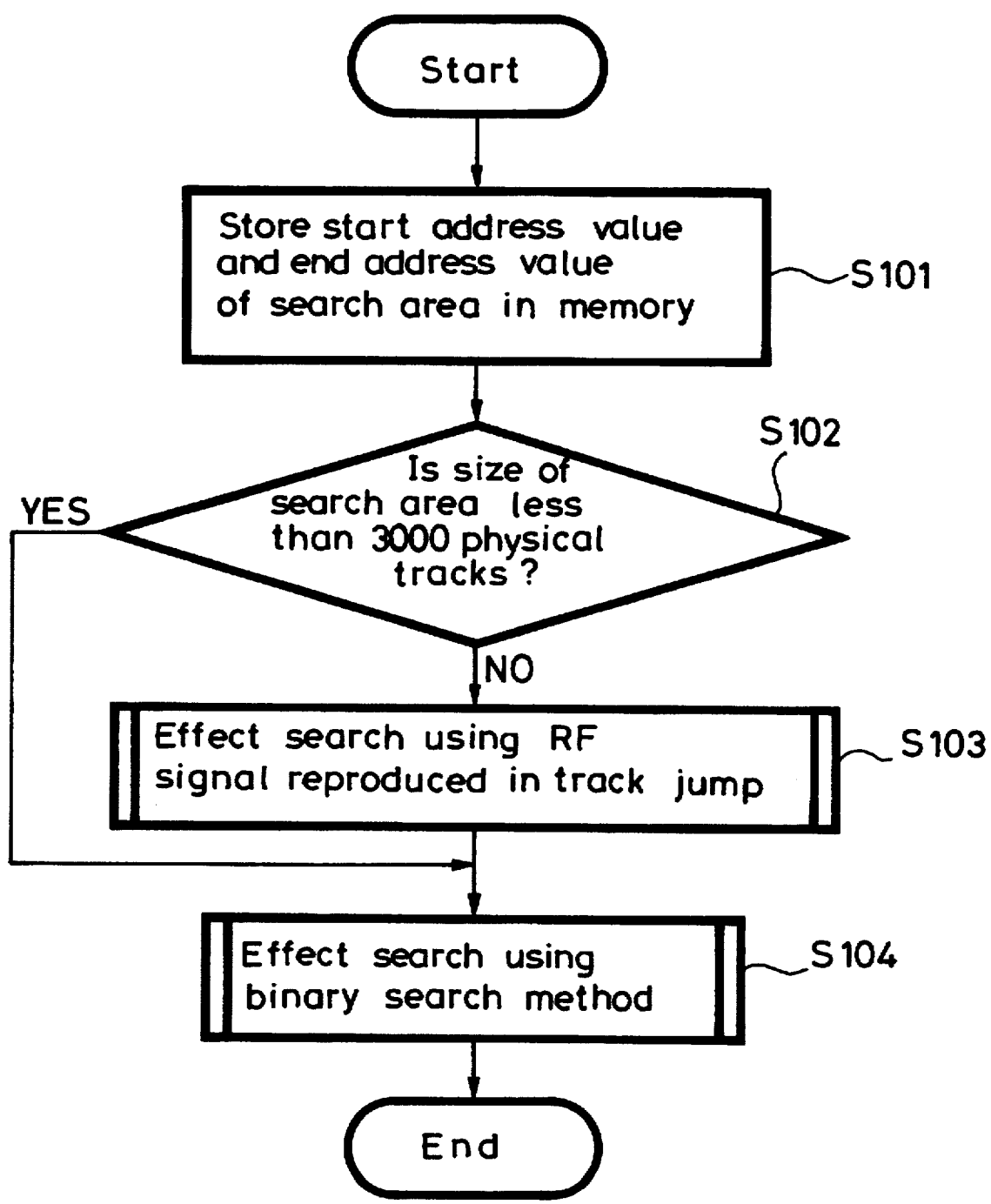
FIG. 7 is a flowchart of a procedure for searching a non-recording area.

FIG. 7 is a flowchart to which reference will be made in explaining a procedure for searching the non-recording area.

Referring to FIG. 7, following the start of operation, at a step S101, values of start address (position information) and end address (position information) of searched track are stored in the memory 11 as values of start address and end address of searched area. Then, control goes to the next decision step S102, whereat it is determined whether or not the size of the search area is less than 3000 physical tracks. If the size of the search area is less than 3000 physical tracks as represented by a YES at the decision step S102, then control goes to a step S104, whereat the boundary between the recording area and the non-recording area is detected by using a binary search method. If on the other hand the size of the search area is greater than the 3000 physical tracks as represented by a NO at the decision step S102, then control goes to a step 103, whereat search using an RF signal reproduced during track jump is carried out. After the schematic boundary between the recording area and the non-recording area has been detected, the position of the strict boundary between the recording area and the non-recording area is detected by effecting the search using the binary search method at the step S104. Then, control is ended.

Figure 8:
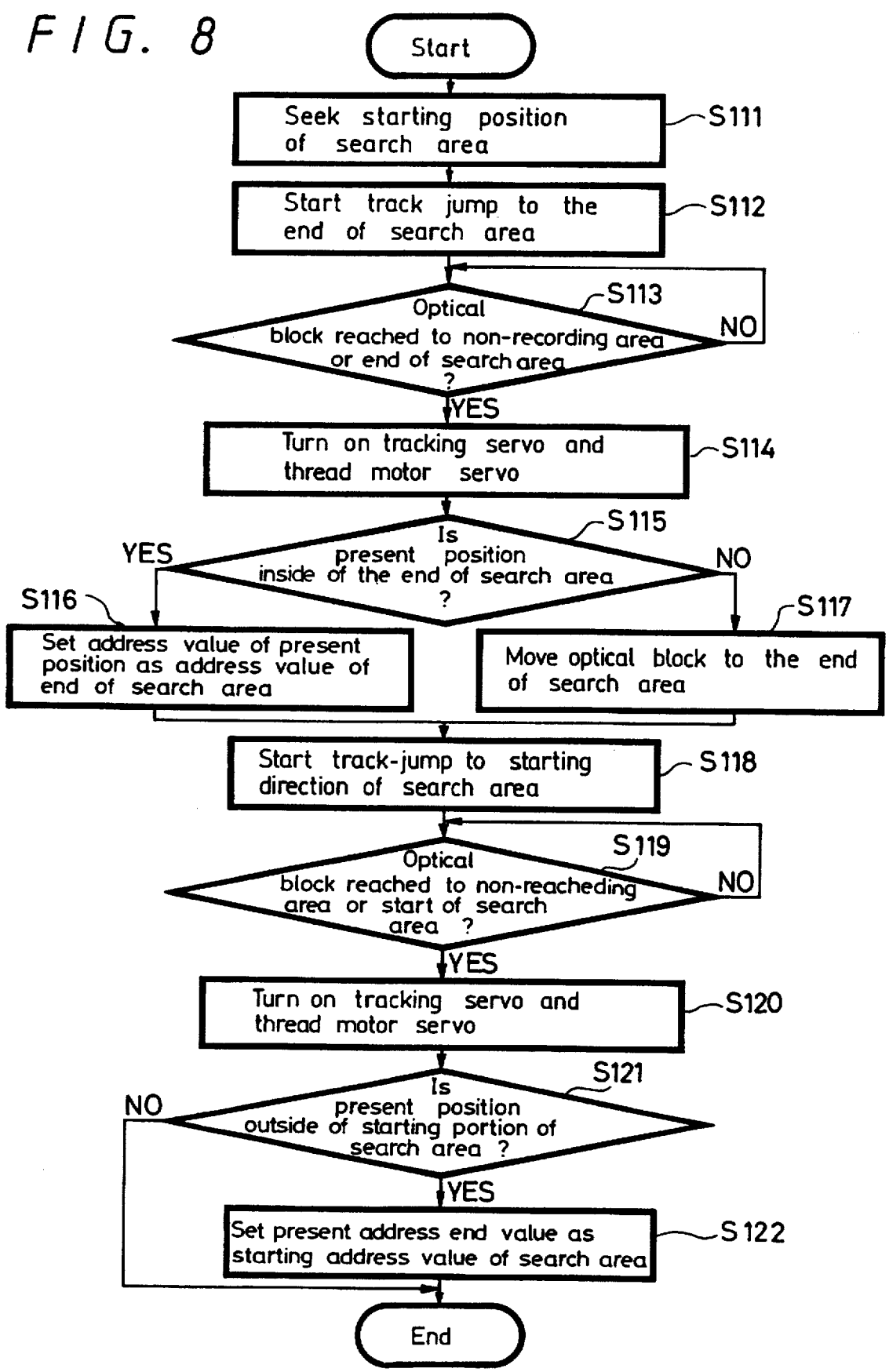
FIG. 8 is a flowchart of a search procedure using an RF signal during track jump.

FIG. 8 is a flowchart to which reference will be made in explaining a search procedure using the RF signal reproduced during track jump.

Referring to FIG. 8, following the start of operation, at a step S111, the CPU block 10 causes the optical block 5 to seek the starting position of the search area on the CD-R 1. Then, control goes to a step S112, whereat the optical block 5 starts track jump in the direction of the end address of the search area, i.e., in the end direction. In this track jump operation, reproducing laser beam is irradiated on the CD-R 1 from the laser light-emitting diode of the optical block 5. Reflected light of this laser beam is received by a photodiode. An amount of received light is supplied to the signal processor 7, and the signal processor 7 generates a tracking error signal and a focus error signal. The tracking error signal and the focus error signal are supplied to and used by the servo circuit 3 for controlling the movement of a tracking actuator and a focus actuator.

An information component of a reproduced signal from the signal processor 7 is outputted as the RF signal. The signal processor 7 determines whether or not the RF signal contains a data component. A judged result is supplied to the CPU block 10.

In a decision step S113, it is determined by the CPU block 10 whether or not the optical block 5 reaches the non-recording area within the search area or the end of the search area. If the optical block 5 does not reach the non-recording area or the end of the search area as represented by a NO at the decision step S113, then the track jump operation is carried out and the judging operation at the step S113 is repeated. If on the other hand the optical block 5 reaches the non-recording area of the search area or the end of the search area as represented by a YES at the decision step S113, then control goes to a step S114, whereat the CPU block 10 turns on a tracking servo and a sled motor servo to control the servo circuit 3 so that the optical block 5 is advanced to and stopped at the position a little ahead of the detected position.

Then, control goes to the next decision step S115, whereat it is determined by the CPU block 10 whether or not the present position of the optical block 5 is inside of the end of the search area. If the present position is inside of the end of the search area as represented by a YES at the decision step S115, then control goes to a step S116, whereat an address value of the present position is set as an address value of the end of the search area. Thus, the search area is narrowed. If on the other hand the present position is not inside of the end of the search area as represented by a NO at the decision step S115, then it is determined that the optical block 5 is passed through the search area. Then, control goes to a step S117, whereat the optical block 5 is moved to the position of the end of the search area.

In the next step S118, the CPU block 10 causes the optical block 5 to track-jump in the starting direction of the search area. It is determined at the next decision step S119 by the CPU block 10 whether or not the optical block 5 reaches the non-recording area within the search area or the starting portion of the search area. If the optical block 5 does not reach the non-recording area within the search area or the starting portion of the search area as represented by a NO at the decision step S119, then the optical block 5 track-jumps to the starting direction of the search area and the judging operation at the decision step S119 is repeated. If on the other hand the optical block 5 reaches the non-recording area within the search area or the starting portion of the search area as represented by a YES at the decision step S119, then control goes to a step S120, whereat the CPU block 10 turns on the tracking servo and the sled motor servo to control the servo circuit 3 so that the optical block 5 is advanced to and stopped at the position a little ahead of the detected position.

Then, control goes to the next decision step S121, whereat it is determined by the CPU block 10 whether or not the present position of the optical block 5 is outside of the starting portion of the search area. If the present position is outside of the starting portion of the search area as represented by a YES at the decision step S121, then control goes to the next step S122, whereat the present address value is set as the starting address value of the search area, and control goes to the end. Thus, the search area is narrowed. If on the other hand the present position is not outside of the starting portion of the search area, then the starting address value of the search area is left as it is, and control goes to the end.

As described above, the optical block 5 track-jumps and it is determined based on the RF signal of the reproduced signal whether or not data is recorded. Therefore, a schematic boundary between the recording area and the non-recording area can be searched at a high speed.

Figure 9:
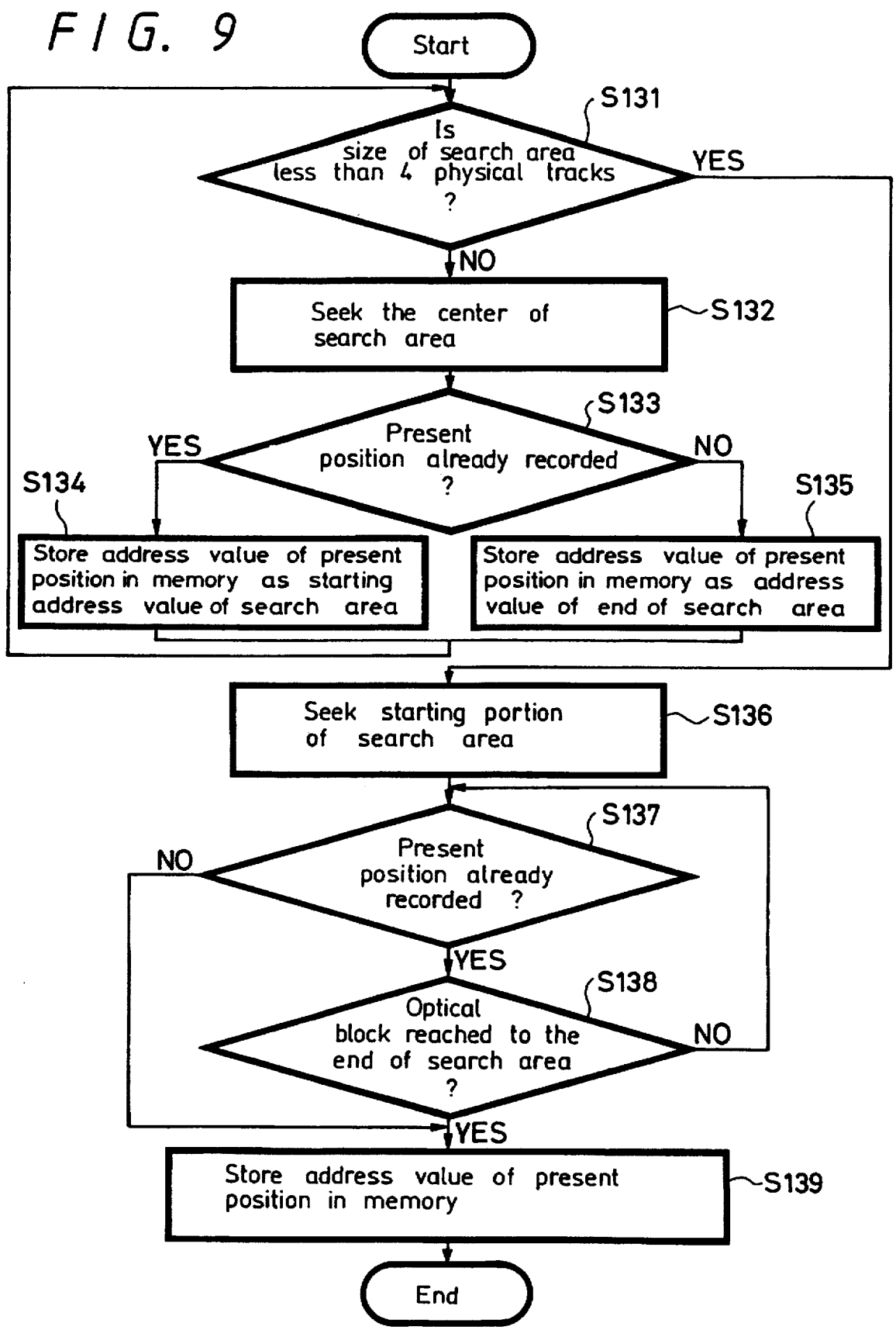
FIG. 9 is a flowchart of a search procedure using a binary search.

FIG. 9 is a flowchart of a search procedure using the binary search method.

Referring to FIG. 9, following the start of operation, control goes to the next decision step S131, whereat it is determined by the CPU block 10 whether or not the size of the search area that was set by the search using the RF signal of the reproduced signal in the previous track jump is less than 4 physical tracks. If the size of the above search area is not less than 4 physical tracks as represented by a NO at the decision step S131, then control goes to a step S132, whereat the optical block 5 seeks the center of the search area, i.e., the end direction.

During the seek operation, the RF signal detected by the signal processor 7 is converted into a binary signal and supplied to a PLL (phase-locked loop) circuit (not shown). The PLL circuit (not shown) reproduces a clock signal based on the binary signal, and the resultant clock signal is supplied to the encoder/decoder 8. The encoder/decoder 8 decodes the binary signal by use of the clock signal, thereby reproducing a data signal and a subcode. The reproduced data signal is outputted from the terminal 13 and the reproduced subcode is supplied to the CPU block 10. The CPU block 10 controls data by use of the subcode supplied thereto.

The clock signal reproduced by the PLL circuit (not shown) is supplied to the servo circuit as a read clock of the RF signal, in which it is compared with a spindle servo reference signal. A compared output is supplied to a spindle motor driver as a rotation error signal used to reproduce data. The spindle motor driver controls the spindle motor 2 by use of the rotation error signal.

Thereafter, control goes to the next decision step S13, whereat it is determined by the CPU block 10 whether or not the present position of the optical block 5 was already recorded. If the present position of the optical block 5 was already recorded as represented by a YES at the decision step S133, then control goes to a step S134, whereat the address value of the present position is stored in the memory 11 as the starting address value of the search area. If on the other hand the present position of the optical block 5 was not yet recorded as represented by a NO at the decision step S133, then control goes to a step S135, whereat the address value of the present position is stored in the memory 11 as the address value of the end of the search area. If the operation shown in the step S134 or S135 is finished, then control goes back to the step S131, whereat it is determined by the CPU block 10 whether or not the size of the search area is less than the 4 physical tracks. As described above, the above-mentioned operation is repeated until the size of the search area becomes less than the 4 physical tracks.

If the size of the search area is less than the 4 physical tracks as represented by a YES at the decision step S131, then control goes to a step S136, whereat the optical block 5 track-jumps to the starting direction of the search area. Then, control goes to the next decision step S137, whereat it is determined by the CPU block 10 whether or not the present position of the optical block 5 was already recorded. If the present position of the optical block 5 was not yet recorded as represented by a NO at the decision step S137, then it is determined that the present position is the boundary between the recording area and the non-recording area. Control goes to a step S139, whereat address value of the present position is stored in the memory 11 and the search using the binary search method is ended.

If on the other hand the present position of the optical block 5 was already recorded as represented by a YES at the decision step S137, then control goes to the next decision step S138, whereat it is determined by the CPU block 10 whether or not the optical block 5 reaches the end of the search area. If the optical block 5 reaches the end of the search area as represented by a YES at the decision step S138, then control goes to the step S139, whereat an address value of this position is stored in the memory 11. Then, the search using the binary search method is ended. If the non-recording area does not exist in the search area, then the position of the end of the search area is detected as described above.

If on the other hand the optical block 5 does not yet reach the end of the search area as represented by a NO at the decision step S138, then the optical block 5 further seeks the starting direction of the search area and the decision step S137 for determining whether or not the present position of the optical block 5 was already recorded is repeated.

A size of search area that is judged before the search is started and a size of search area that is first judged by use of the binary search method may be set to be arbitrary sizes.

Figure 10:
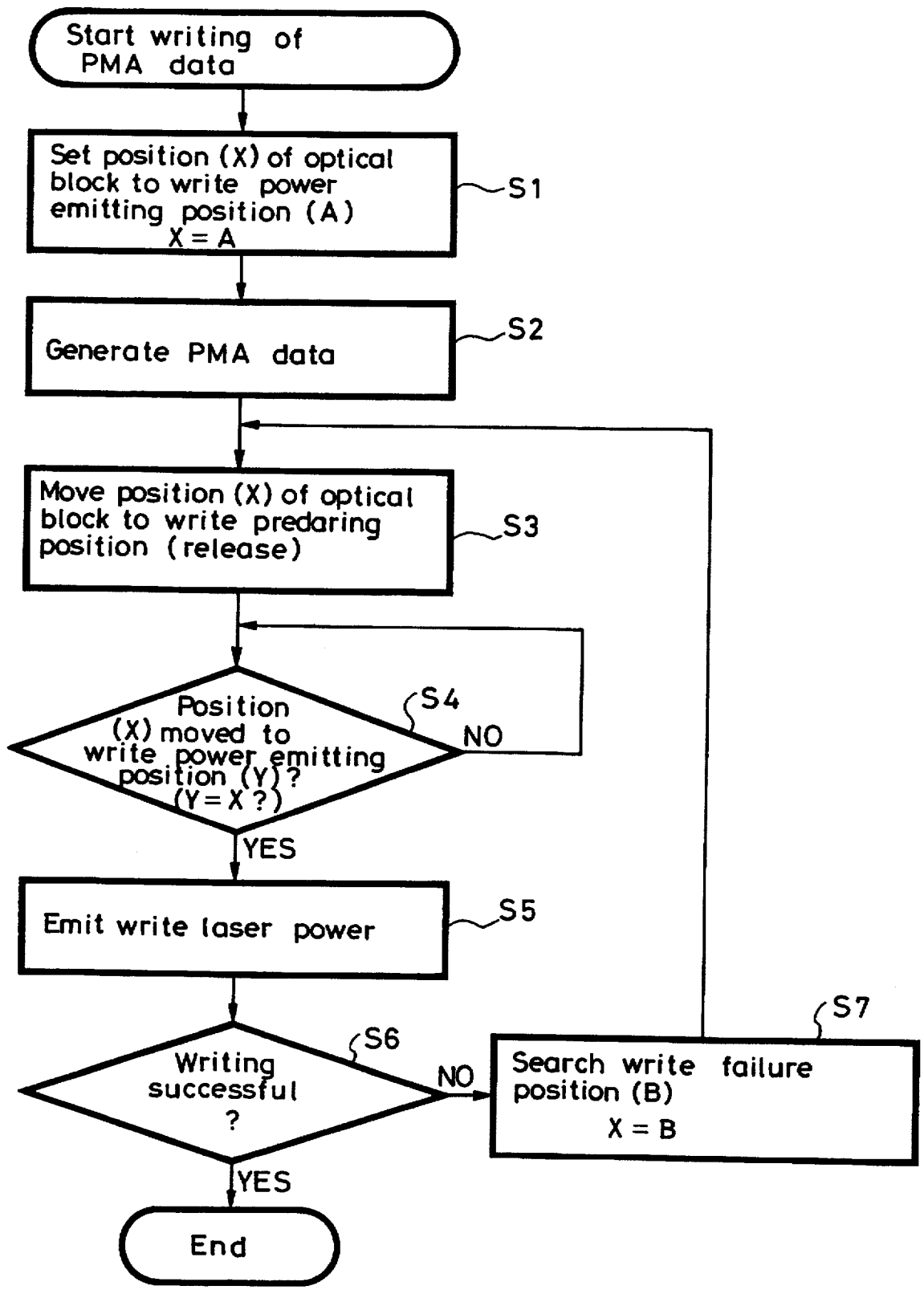
FIG. 10 is a flowchart showing a PMA write sequence in the write once optical disk recording apparatus according to the present invention.
Figure 11:
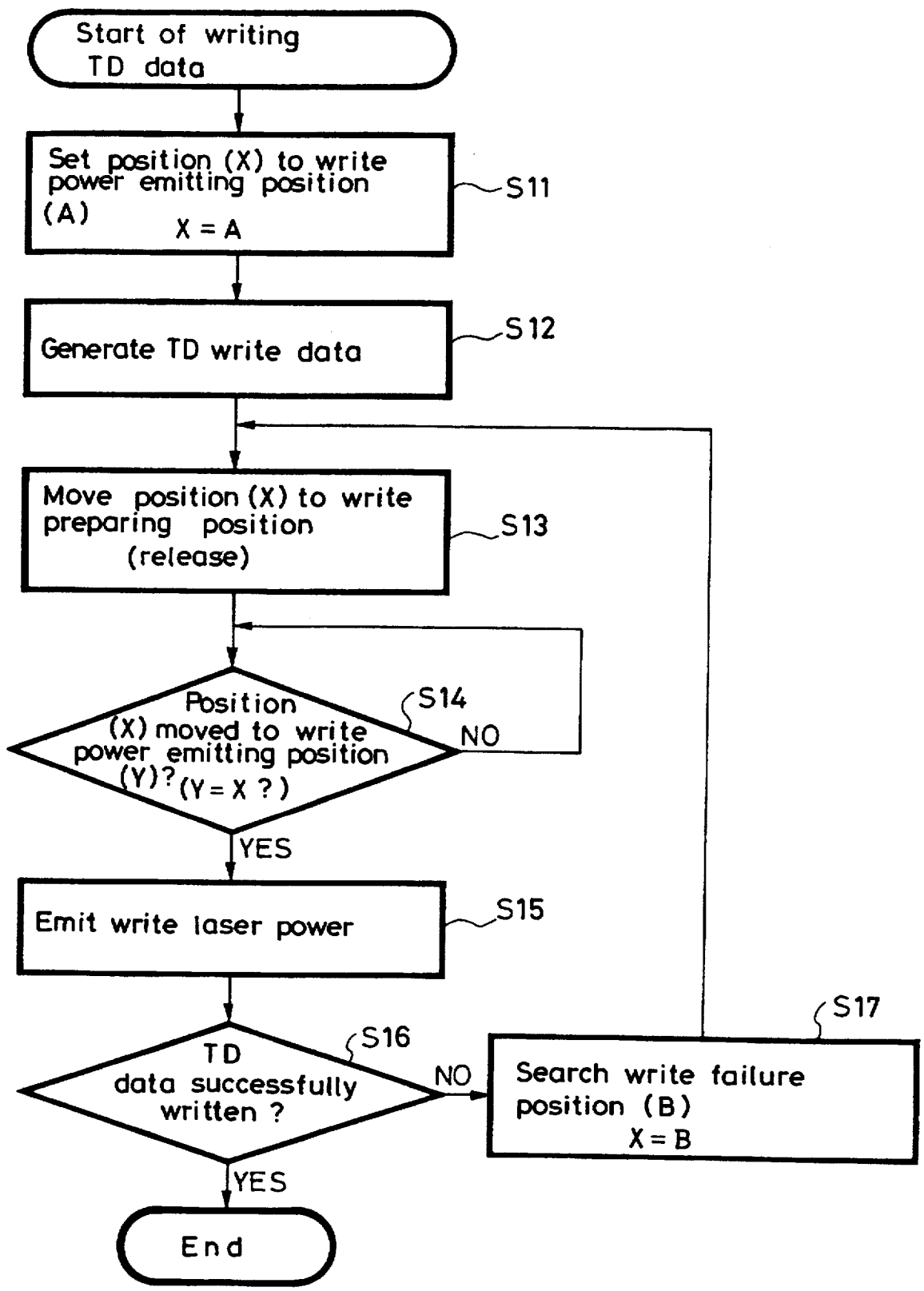
FIG. 11 is a flowchart showing a TD write sequence of the write once optical disk recording apparatus according to the present invention.

Specific repair operation will be described. FIG. 10 is a flowchart showing a PMA write sequence of the write once optical disk recording apparatus according to the present invention. FIG. 11 is a flowchart used to explain operation of the write once optical disk recording apparatus according to the present invention.

Referring to FIG. 10, following the start of writing the PMA, control goes to a step S1, whereat the CPU block 10 generates a control signal such that a position (X) of the optical block 5 is set to a write power emitting position (write start position A). Then, control goes to a step S2, whereat the CPU block 10 supplies a control signal to the encoder/decoder 8 such that the encoder/decoder 8 generates PMA write data which will be described later on with reference to FIG. 14. Then, control goes to a step S3, whereat the CPU block 10 supplies a control signal to the servo circuit 3 in such a manner that the position (X) of the optical block 5 is moved by the thread motor 4 to a write preparing position, in this case, the write power emitting position (write start position A). Thus, the optical block 5 releases the initial position and is moved to the radius direction of the CD-R 1.

In the next decision step S4, it is determined by the CPU block 10 whether or not the position (X) of the optical block 5 is moved from the write preparing position to the write power emitting position (Y), in this case, the write start position (A). The CPU block 10 repeats the decision step S4 until the position (X) of the optical block 5 finishes having moved to the write power emitting position (Y). If the position (X) of the optical block 5 finishes having moved to the write power emitting position (Y) as represented by a YES at the decision step S4, then control goes to a step S5, whereat the CPU block 10 supplies control signals to the signal modulator 6 and a laser driver (not shown) in such a manner that the laser light-emitting diode of the optical block 5 is energized to emit write laser power.

Then, control goes to the next decision step S6, whereat it is determined by the CPU block 10 whether or not PMA is written at a predetermined recording unit. Specifically, it is determined by the CPU block 10 based on the tracking error signal and the focus error signal supplied from the servo circuit 3 whether the writing is successful. When the PMA is written at the predetermined recording unit, the same data is written over 10 frames or the same data is written over 5 frames. Accordingly, this recording unit is recorded by an amount corresponding to information tracks to be recorded on the CD-R 1 and the writing is completed.

Figure 13:
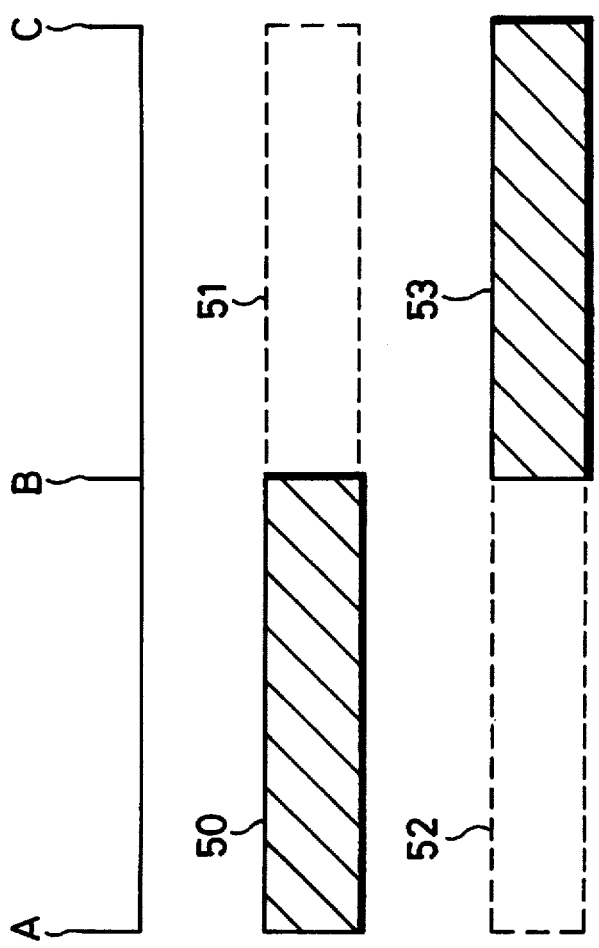
FIGS. 13A to 13C are schematic diagrams showing an operation of the write once optical disk recording apparatus according to the present invention.

If the writing is failed as represented by a NO at the decision step S6, then control goes to a step S7, wherein the CPU block 10 searches a writing failure position (B) by supplying a control signal to the servo circuit 3 in such a manner that the position (X) of the optical block 5 is moved by the sled motor 4 to the writing failure position (B). At that time, as shown in FIG. 13, write data is written in the area ranging from the write start position (A) to the writing failure position (B) as write successful data 50 and write data is not written in the area ranging from the writing failure position (B) to a writing end position (C). As a consequence, write data becomes write failure data 51. The write failure position (B) is searched based on the above-mentioned binary search method. Processing and judgement at the steps S3 to S6 are repeated. If the writing is successful as represented by a YES at the decision step S6, then control is ended.

Specifically, at the step S3, the CPU block 10 supplies the control signal to the servo circuit 3 such that the position (X) of the optical block 5 is moved by the thread motor 4 from the write power emitting position (write start position A) to the write failure position (B) searched at the step S7. As a consequence, the optical block 5 releases the initial position and is moved in the radius position of the CD-R 1. At that time, the CPU block 10 supplies control signals to the signal modulator 6 and the laser driver (not shown) in such a manner that the laser power of the laser light-emitting diode of the optical block 5 becomes read laser power although the timing is the write timing. Accordingly, the optical block 10 only traces the CD-R 1 from the write start position (A) to the write failure position (B) with the result that write once data at that time becomes data 52 which is traced by read power.

It is determined by the CPU block 10 at the decision step S4 whether or not the position (X) of the optical block 5 is moved from the write preparing position to the write power emitting position (Y), in this case, the write failure position (B). The CPU block 10 repeats the decision step of S4 until the position (X) of the optical block 5 finishes having been moved to the write power emitting position (Y). If the position (X) of the optical block 4 has finished having been moved to the write power emitting position (Y) as represented by a YES at the decision step S4, then control goes to the step S5, whereat the CPU block 10 supplies control signals to the signal modulator 6 and the laser driver in such a manner that the laser light-emitting diode of the optical block 5 emits write laser power. Then, PMA data is continuously and repeatedly recorded from the write failure position (B)) based on the PMA recording format.

In the next decision step S6, it is determined one more time by the CPU block 10 whether or not the writing of PMA data is successfully carried out at the predetermined recording unit. In other words, it is determined by the CPU block 10 based on the tracking error signal and the focus error signal supplied from the servo circuit 3 whether or not the writing is successful. If the PMA data is successfully written at the predetermined unit as represented by a YES at the decision step S6, then control is ended. At that time, write once data is becomes write once data 53 of write power from the write failure position (B) to the write end position (C) as shown in FIG. 13.

FIG. 11 is a flowchart showing a TD write sequence of the write once optical disk recording apparatus according to this embodiment.

Referring to FIG. 11, following the start of writing the TD, control goes to a step S11, whereat the CPU block 10 generates a control signal in such a manner that the position (X) of the optical block 5 is set to the write power emitting position (write start position A). Then, control goes to a step S12, whereat the CPU block 10 supplies a control signal to the encoder/decoder 8 in such a manner that the encoder/decoder 8 generates TD write data. In the next step S13, the CPU block 10 supplies a control signal to the servo circuit 3 in such a manner that the position (X) of the optical block 5 is moved by the sled motor 4 to the write preparing position, in this case, the write power emitting position (write start position A). As a result, the optical block 5 releases the initial position and is moved to the radius direction of the CD-R 1.

It is determined in the next decision step S14 by the CPU block 10 whether or not the position (X) of the optical block 5 is moved from the write preparing position to the write power emitting position (Y), in this case, the write start position (A). The CPU block 10 repeats the above decision step S14 until the position (X) of the optical block 5 finishes having moved to the write power emitting position (Y). If the position (X) of the optical block 5 has finished being moved to the write power emitting position (Y) as represented by a YES at the decision step S14, then control goes to a step S15, whereat the CPU block 10 supplies control signals to the signal modulator 6 and the laser driver (not shown) in such a manner that the laser light-emitting diode of the optical block 5 emits write laser power.

Then, control goes to the next decision step S16, whereat it is determined by the CPU block 10 whether or not TD data is successfully written at a predetermined recording unit. In other words, it is determined by the CPU block 10 based on the tracking error signal and the focus error signal whether or not the TD data is successfully written. When the TD data is written at the predetermined recording unit, the same data is written for two seconds, i.e., over 150 frames or longer. Accordingly, data at this recording unit, i.e., run-in data of 5 frames is recorded, the same TD data of about 150 frames is recorded repeatedly and run-out data of 3 frames are recorded in the CD-R 1 and the writing is completed.

If the writing of TD data is not successful as represented by a NO at the decision step S16, then control goes to a step S17, whereat the CPU block 10 searches a write failure position (B) by supplying a control signal to the servo circuit 3 such that the position (X) of the optical block 5 is moved by the sled motor 4 to the write failure position (B). At that time, write data is written in the area ranging from the write start position (A) to the write failure position (B) as write successful data 50 as shown in FIG. 13. Write data is not recorded in the area ranging from the write failure position (B) to the write end position (C) and becomes write failure data 51 as shown in FIG. 13. The write failure position (B) is searched based on the above-mentioned binary search method similarly to the case of the PMA data. Processing and judgement at the steps S13 to S16 are repeated. Then, if the writing is successful as represented by a YES at the decision step S16, then control is ended.

Specifically, at the step S13, the CPU block 10 supplies a control signal to the servo circuit 3 such that the position (X) of the optical block 5 is moved by the sled motor 4 from the write preparing position, in this case, the write power emitting position (write start position A) to the write failure position (B) searched at the step S17, resulting in the optical block 5 releasing the initial position and being moved in the radius position of the CD-R 1. At that time, the CPU block 10 supplies control signals to the signal modulator 6 and the laser driver (not shown) such that the laser power of the laser light-emitting diode of the optical block 5 become read laser power although the timing is the write timing. As a consequence, the optical block 5 only traces the CD-R 1 from the write start position (A) to the write failure position (B) with the result that write once data at that time becomes data to be traced with read power as shown in FIGS. 13A to 13C.

It is determined at the decision step S14 by the CPU block 10 whether or not the position (X) of the optical block 5 is moved from the write preparing position to the write power emitting position (Y), in this case, the write failure position (B). The CPU block 10 repeats the decision step S14 until the position (X) of the optical block 5 has finished being moved to the write power emitting position (Y). If the position of the optical block 5 has finished being moved to the write power emitting position (Y) as represented by a YES at the decision step S14, then control goes to the step S15, whereat the CPU block 10 supplies control signals to the signal modulator 6 and the laser driver such that the laser light-emitting diode of the optical block 5 emits write laser power. Then, the TD data is continuously and repeatedly recorded from the write failure position (B) based on the TD data recording format.

In the next decision step S16, it is determined by the CPU block 10 whether or not the TD data is successfully written at a predetermined recording unit. In other words, it is determined at the decision step S16 by the CPU block 10 based on the tracking error signal and the focus error signal whether or not TD data is written successfully. If the TD data is written successfully as represented by a YES at the decision step S16, then control is ended. At that time, write once data becomes write power write once data 53 in the area ranging from the write failure position (B) to the write end position (C) as shown in FIG. 13C.

Figure 12:
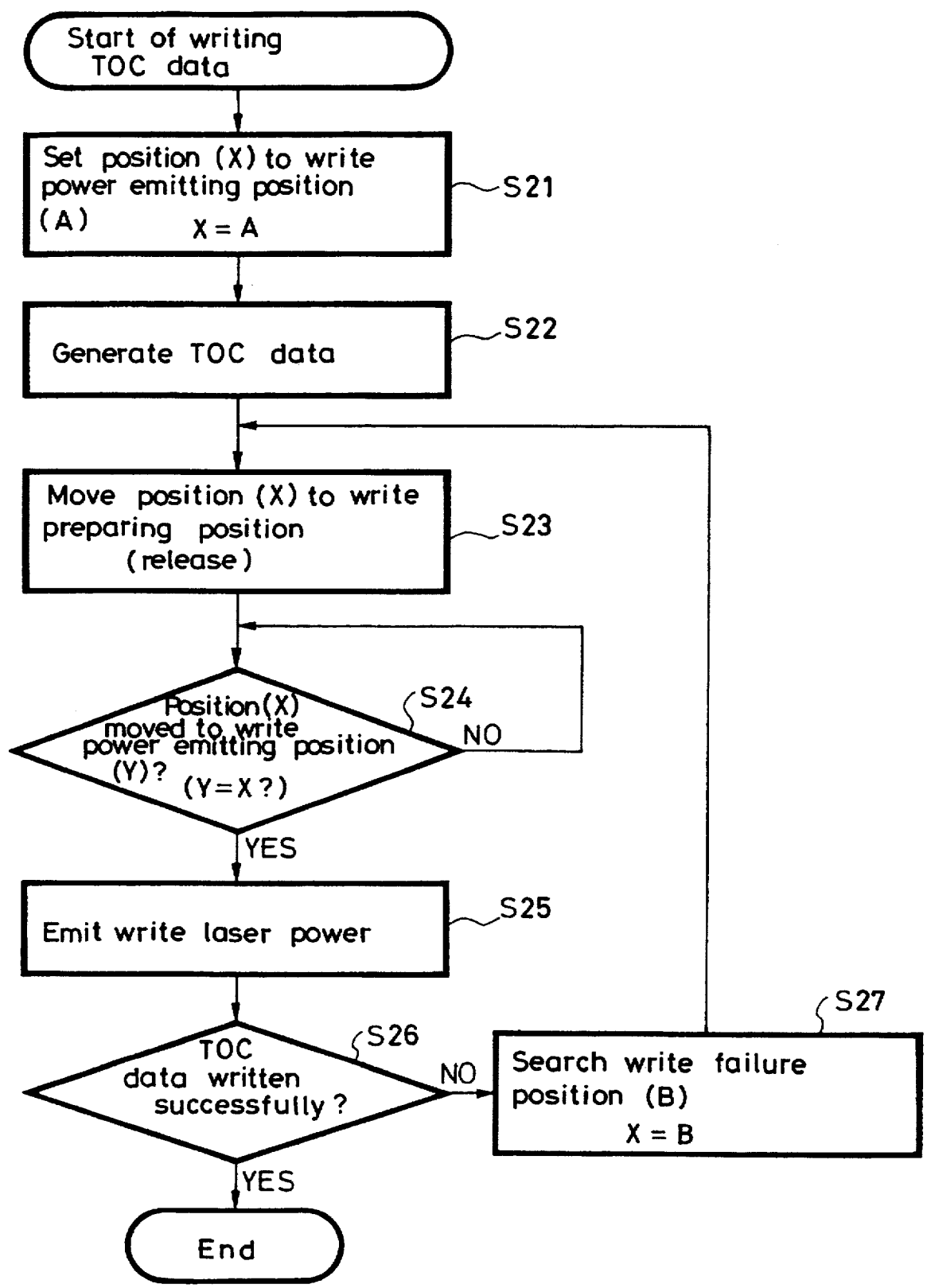
FIG. 12 is a flowchart showing a TOC write sequence of the write once optical disk recording apparatus according to the present invention.

FIG. 12 is a flowchart showing a TOC data write sequence of the write once optical disk recording apparatus according to this embodiment.

Referring to FIG. 12 , following the start of writing TOC data, then control goes to a step S21, whereat the CPU block 10 generates a control signal such that the position (X) of the optical block 5 is set to the write power emitting position (write start position A). In the next step S22, the CPU block 10 supplies a control signal to the encoder/decoder 8 such that the encoder/decoder 8 generates TOC write data which will be described later on with reference to FIG. 15. In the next step S23, the CPU block 10 supplies a control signal to the servo circuit 3 in such a fashion that the position (X) of the optical block 5 is moved by the sled motor 4 to the reference preparing position, in this case, the write power emitting position (write start position A), resulting in the optical block 5 releasing the initial position and being moved in the radius direction of the CD-R 1.

It is determined at the next decision step S24 by the CPU block 10 whether or not the position (X) of the optical block 5 is moved from the write preparing position to the write power emitting position (Y), in this case, the write start position (A). The CPU block 10 repeats this decision step S24 until the position (X) of the optical block 5 has finished being moved to the write power emitting position (Y). If the position (X) of the optical block 5 has finished being moved to the write power emitting position (Y) as represented by a YES at the decision step S24, then control goes to a step S25, whereat the CPU block 10 supplies control signals to the signal modulator 6 and the laser driver (not shown) in such a manner that the laser light-emitting diode of the optical block 5 emits write laser power. Then, the TOC data is continuously and repeatedly recorded from the write failure position (B) based on the TOC data recording format.

It is determined at the next decision step S16 by the CPU block 10 whether or not TOC data is successfully written at a predetermined recording unit. In other words, it is determined by the CPU block 10 based on the status of the tracking error signal and the focus error signal whether or not the TOC data is written successfully. When the TOC data is written at the predetermined recording unit, the same data such as start address of each track or format information are written three times. Accordingly, the TOC data is recorded at this recording unit, i.e., the three same TOC data is repeatedly written in the CD-R 1 and then the writing is ended.

If the TOC data is not written successfully as represented by a NO at the decision step S26, then control goes to a step S27, whereat the CPU block 26 searches the write failure position (B) by supplying a control signal to the servo circuit 3 such that the position (X) of the optical block 5 is moved by the sled motor 4 to the write failure position (B). At that time, write data is recorded in the area ranging from the write start position (A) to the write failure position (B) as the write successful data 50. Also, write data is not recorded in the area ranging from the write failure position (B) to the write end position (C) and becomes the write failure data 51 as shown in FIG. 13B. The write failure position (B) is searched by the above-mentioned binary search method similarly to the cases of the PMA and TD data. Processing and judgement at the steps S23 to S26 are repeated. Then, if the TOC data is written successfully as represented by a YES at the decision step S26, then control is ended.

Specifically, in the step S23, the CPU block 10 supplies a control signal to the servo circuit 3 such that the position (X) of the optical block 5 is moved by the sled motor 4 from the write preparing position, in this case, the write power emitting position (write start position A) to the write failure position (B) that was searched at the step S27, resulting in the optical block 5 releasing the initial position and being moved in the radius direction of the CD-R 1. At that time, the CPU block 10 supplies control signals to the signal modulator 6 and the laser driver (not shown) in such a manner that the laser power of the laser light-emitting diode of the optical block 5 becomes read laser power although the timing is the write timing. As a consequence, the optical block 10 only traces the CD-R 1 from the write start position (A) to the write failure position (B) with the result that write once data becomes the data 52 to be traced with read power as shown in FIG. 13C.

It is determined at the decision step S24 by the CPU block 10 whether or not the position (X) of the optical block 5 is moved from the write preparing position to the write power emitting position (Y), in this case, the write failure position (B). The CPU block 10 repeats the decision step of S24 until the position (X) of the optical block 5 has finished being moved to the write power emitting position (Y). If the position (X) of the optical block 5 has finished being moved to the write power emitting position (Y) as represented by a YES at the decision step S24, then control goes to the next step S25, whereat the CPU block 10 supplies control signals to the signal modulator 8 and the laser driver in such a manner that the laser light-emitting diode of the optical block 5 emits write laser power.

In the decision step S26, it is determined one more time by the CPU block 10 whether or not the TOC data is successfully written at a predetermined recording unit. Specifically, the CPU block 10 determines based on the status of the tracking error signal and the focus error signal supplied thereto from the servo circuit 3 whether or not the TOC data is successfully written at the predetermined recording unit. If the TOC data is successfully written as represented by a YES at the decision step S26, then control is ended. At that time, write once data becomes write once data of write power in the area ranging from the write failure position (B) to the write end position (C) as shown in FIGS. 13A to 13C.

When any one of repetitive data of PMA, TD, TOC is written, the CPU block 10 stores data indicative of the successful recording of the frame of the track during recording in the memory 11 and controls the recording such that the recording for repair is executed from the end of continuous data.

When the recording of fixed length packet is failed in somewhere of the recording, data can be repaired by a similar method. Specifically, the write area of the fixed length packet can be detected based on the run-in area, and the position of the run-out area or the like can be detected based on the writing start position of the track and the packet length. At that time, the frame of link block becomes equal to the start address of track+(packet length+7)×n−5 where n is the integer representing the number of packets and (packet length+7) represents the write length of one packet.

FIG. 14 shows a recording format of PMA data of the write once optical disk recording apparatus according to the present invention. As shown in FIG. 14, in response to the frame numbers (Frame Number) of "1" to "50", there are respectively written control and address numbers (CONTROL & ADR) of "01" to "50", track numbers (TNO, POINT), track end address times (MIN, SEC, FRM), ZERO of "00" to "09" and track start address time (PMIN, PSEC, PFRM). As shown in FIG. 14, in the 10 frames of frame number "11" to "20", there are repeatedly recorded two data of data of frame numbers "11" to "15" and data of frame numbers "16" to "20" five times. The repeated data 60 of 10 frames from frame number "11" to "20" are recorded in one sequence.

FIG. 15 shows a recording format of TOC data of the write once optical disk recording apparatus according to the present invention. As shown in FIG. 15, in response to frame numbers (Frame Number) of "n" to "n+54", there are respectively recorded control and address numbers (CONTROL & ADR) from "01" to "05", track numbers (TNO, POINT), track end address times (MIN, SEC, FRM), ZERO and track start address times (PMIN, PSEC, PFRM). As shown in FIG. 15, in the three frames from frame number "n" to "n+2", there are repeatedly recorded the same data three times. Repeated data 70 of three frames from the frame numbers "n" to "n+2" are recorded in one sequence.

U.S. patent application Ser. No. 08/460,320 that was previously proposed by the same assignee of the present application discloses a manner in which the above-mentioned write failure position (B) is searched.

According to the write once optical disk recording method, when information is recorded on the CD-R 1 serving as the write once optical disk by the laser light-emitting diode of the optical disk 5, information is recorded according to the recording format in which at least PMA, TD, TOC data serving as accompanying information concerning CD-R 1 or recorded information are repeatedly recorded a plurality of times prior to recording information together with the recording information. In accordance with this write once optical disk recording method based on the above-mentioned recording format, when the recording of PMA, TD and TOC data is failed, the recording failure position (B) is searched, the optical block 5 is moved from the recording start position (A) to the recording failure position (B), and PMA, TD and TOC data are recorded from the recording failure position (B) by the laser light-emitting diode of the optical block 5. Therefore, without destroying the recording format, the PMA, TD and TOC data can be repaired with ease, whereby the recording in the recording unit area is completed. Thus, information can be recorded on the following area. Also, information can be read out from the same CD-R 1 by other drive apparatus than the drive apparatus which made the recording on this CD-R 1.

In the write once optical disk recording method according to the present invention, during the optical block 5 is moved from the recording start position (A) to the recording failure position (B), the level of the drive signal for driving the optical block 5, the signal modulator 6 and the laser driver (not shown) is decreased. During identification information for the CD-R 1 is recorded from the recording failure position (B) by the laser light-emitting diode of the optical block 5, the level of the drive signal for driving the optical block 5, the signal modulator 6 and the laser driver is increased. Thus, if the processing for the same information signal is repeated and the level of the drive signal is switched before and after the recording failure position (B), then PMA, TD and TOC data can be repaired with ease.

In the write once optical disk recording method according to the present invention, since the fact that the recording of PMA, TD and TOC data is failed is identified based on the error signal from the servo circuit 3 through the laser light-emitting diode of the optical block 5, recorded information need not be reproduced at once and verified. Therefore, while information is being recorded, the failure of recording can be identified and thus PMA, TD and TOC data can be repaired with ease.

Since a write once optical disk recording method according to the present invention is such one that the PMA data contains address information of at least recording information, the address information can be repaired without destroying the recording format. Thus, information can be recorded on the following area based on the address information.

When the recording of PMA, TD and TOC data is failed, the light-emitting timing of the write laser power of the laser light-emitting diode of the optical block 5 is switched as described above. The present invention is not limited thereto and the following variant is also possible. That is, only PMA, TD, TOC data in the repaired data area may be generated and recorded from the recording failure position (B) by the write laser power of the laser light-emitting diode of the optical block 5.

An information recording method according to the present invention is an information recording method based on a recording format in which when information is recorded on the information recording medium by the recording means, accompanying information concerning at least an information recording medium or recording information is repeatedly recorded a plurality of times together with recording information prior to the recording information. According to this information recording method, when recording of accompanying information is failed, a recording failure position is searched, a recording means is moved from a recording start position to a recording failure position and the accompanying information is recorded from the recording failure position by the recording means. Therefore, without destroying the recording format, the accompanying information can be repaired with ease, whereby recording in the recording unit area is completed. Thus, information can be recorded on the following area and also information can be read out from the same recording medium by other drive apparatus than the drive apparatus which made the recording on this recording medium.

The information recording method according to the present invention is such one that during the recording means is moved from the recording start position to the recording failure position, the level of the drive signal for driving the recording means is decreased and that during identification information for the information recording medium is recorded from the recording failure position by the recording means, the level of the drive signal for driving the recording means is increased. Therefore, if the processing of the same information signal is repeated and the level of the drive signal is switched before and after the recording failure position, then accompanying information can be repaired with ease.

The information recording method according to the present invention is such one that the fact that recording of identification information for identifying the information recording medium is failed can be identified based on the error signal from the servo circuit provided through the recording means. Therefore, recorded information need not be reproduced at once and verified, the failure of recording can be identified while information is being recorded, and accompanying information can be repaired with ease.

The information recording method according to the present invention is such one that the accompanying information contains address information of at least recording information. Therefore, if the address information is repaired without destroying the recording format, then it becomes possible to record information on the following area based on the address information.

The information recording method according to the present invention is such one that the accompanying information is table of contents information of recording information. Therefore, if table of contents information is repaired without destroying the recording format, then it becomes possible to record information on the following area based on the table of contents information.

The write once optical disk recording method according to the present invention is such write once optical disk recording method based on the recording format in which when information is recorded on the write once optical disk by the recording means, accompanying information concerning at least a write once optical disk or recording information is repeatedly recorded a plurality of times prior to the recording information together with the recording information. When the recording of accompanying information is failed, the recording failure position is searched, the recording means is moved from the recording start position to the recording failure position, and the accompanying information is recorded from the recording failure position by the recording means. Therefore, the accompanying information can be repaired with ease without destroying the recording format and thus the recording in the recording unit area is completed. Hence, information can be recorded on the following area and information can be read out from the same write once optical disk by use of other drive apparatus than the drive apparatus which made the recording on this write once optical disk.

The write once optical disk recording method according to the present invention is such write once optical disk recording method in which during the recording means is moved from the recording start position to the recording failure position, the level of the drive signal for driving the recording means is decreased and during identification signal for the write once optical disk is recorded from the recording failure position by the recording means, the level of the drive signal for driving the recording means is increased. Therefore, if the processing for the same information signal is repeated and the level of the drive signal is switched before and after the recording failure position, then the accompanying information can be repaired with ease.

The write once optical disk recording method according to the present invention is such write once optical disk recording method in which the fact that the recording of accompanying information is failed is identified based on the error signal from the servo circuit provided through the recording means. Therefore, recorded information need not be reproduced immediately and verified. Thus, the failure of recording can be identified while information is being recorded and the accompanying information can be easily repaired.

Further, the write once optical disk recording method according to the present invention is such write once optical disk recording method in which the accompanying information contains address information of at least recording information. Therefore, if the address information is repaired without destroying the recording format, then it becomes possible to record information on the following area based on the address information.

Furthermore, the write once optical disk recording method according to the present invention is such write once optical disk recording method in which the accompanying information is table of contents information of recording information. Therefore, if the table of contents information is repaired without destroying the recording format, then it becomes possible to record information on the following area based on the table of contents information.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. An information recording method based on a recording format in which when information is recorded on an information recording medium by recording means, accompanying information concerning at least said information recording medium or recording information is repeatedly recorded a plurality of times together with said recording information, comprising the steps of:

searching a recording failure position in an area in which said accompanying information is to be recorded when a recording of said accompanying information is failed;

moving said recording means from a recording start position to said recording failure position; and recording said accompanying information from said recording failure position by said recording means based on said recording format.

2. An information recording method as claimed in claim 1, wherein said moving step further includes a step for setting level of a drive signal for driving said recording means to be lower than level used when said accompanying information is recorded.

3. An information recording method as claimed in claim 1, wherein said accompanying information contains identification information for said information recording medium repeatedly recorded predetermined times.

4. An information recording method according to claim 1, further comprising a step for identifying a failure of recording of said accompanying information based on an error signal from a servo circuit for controlling said recording means through said recording means.

5. An information recording method as claimed in claim 1, wherein said accompanying information contains address information of at least said recording information.

6. An information recording method as claimed in claim 1, wherein said accompanying information is table of contents information of said recording information.

7. A write once optical disk recording method based on a recording format in which when information is recorded on a write once optical disk by recording means, accompanying information concerning at least said write once optical disk or said recording information is repeatedly recorded a plurality of times together with said recording information, comprising the steps of:

searching a recording failure position in an area in which said accompanying information is to be recorded when a recording of said accompanying information is failed;

moving said recording means from a recording start position to said recording failure position; and recording said accompanying information from said recording failure position by said recording means based on said recording format.

8. A write once optical disk recording method as claimed in claim 7, wherein said moving step further includes a step for setting level of a drive signal for driving said recording means to be lower than level used when said accompanying information is recorded.

9. A write once optical disk recording method as claimed in claim 7, wherein said accompanying information contains identification information for said write once optical disk repeatedly recorded predetermined times.

10. A write once optical disk recording method as claimed in claim 7, further comprising a step for identifying a failure of recording of said accompanying information based on an error signal from a servo circuit for controlling said recording means through said recording means.

11. A write once optical disk recording method as claimed in claim 7, wherein said accompanying information contains address information of at least said recording information.

12. A write once optical disk recording method as claimed in claim 7, wherein said accompanying information is table of contents information of said recording information.

13. A write once optical disk recording method according to claim 7, further comprising a step for previously storing said accompanying information in memory means in such a manner that said accompanying information is continuously recorded after the failure of recording without destroying said recording format.

* * * * *